US012323590B2

(12) United States Patent
Tourapis et al.

(10) Patent No.: US 12,323,590 B2
(45) Date of Patent: Jun. 3, 2025

(54) MULTIDIMENSIONAL QUANTIZATION TECHNIQUES FOR VIDEO CODING/DECODING SYSTEMS

(71) Applicant: APPLE INC., Cupertino, CA (US)

(72) Inventors: Alexandros Tourapis, Milpitas, CA (US); Yeping Su, Sunnyvale, CA (US); David Singer, San Francisco, CA (US); Hsi-Jung Wu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 200 days.

(21) Appl. No.: 18/056,915

(22) Filed: Nov. 18, 2022

(65) Prior Publication Data

US 2024/0171742 A1 May 23, 2024

Related U.S. Application Data

(63) Continuation of application No. 17/493,607, filed on Oct. 4, 2021, now Pat. No. 11,539,974, which is a
(Continued)

(51) Int. Cl.
*H04N 19/124* (2014.01)
*H04N 19/176* (2014.01)
(Continued)

(52) U.S. Cl.
CPC ......... *H04N 19/124* (2014.11); *H04N 19/176* (2014.11); *H04N 19/18* (2014.11); *H04N 19/60* (2014.11); *H04N 19/91* (2014.11)

(58) Field of Classification Search
CPC .... H04N 19/124; H04N 19/176; H04N 19/18; H04N 19/60; H04N 19/91; H04N 19/126; H04N 19/463
See application file for complete search history.

(56) References Cited

U.S. PATENT DOCUMENTS

2007/0189392 A1 8/2007 Tourapis et al.
2009/0141814 A1 6/2009 Yin et al.
(Continued)

FOREIGN PATENT DOCUMENTS

CN 101371584 A 2/2009
CN 103493490 A 1/2014
(Continued)

OTHER PUBLICATIONS

Tourapis, et al., "Reduced Resolution Update Mode Extension to the H.264 Standard", Thomson Corporate Research, IEEE, 2005.
(Continued)

*Primary Examiner* — Jared Walker
(74) *Attorney, Agent, or Firm* — BakerHostetler

(57) ABSTRACT

Video compression and decompression techniques are disclosed that provide improved bandwidth control for video compression and decompression systems. In particular, video coding and decoding techniques quantize input video in multiple dimensions. According to these techniques, pixel residuals may be generated from a comparison of an array of input data to an array of prediction data. The pixel residuals may be quantized in a first dimension. After the quantization, the quantized pixel residuals may be transformed to an array of transform coefficients. The transform coefficients may be quantized in a second dimension and entropy coded. Decoding techniques invert these processes. In still other embodiments, multiple quantizers may be provided upstream of the transform stage, either in parallel or in cascade, which provide greater flexibility to video coders to quantize data in different dimensions in an effort to balance the competing interest in compression efficiency and quality of reconstructed video.

18 Claims, 12 Drawing Sheets

Related U.S. Application Data continuation of application No. 15/250,608, filed on Aug. 29, 2016, now Pat. No. 11,153,594.

(51) Int. Cl.
  *H04N 19/18* (2014.01)
  *H04N 19/60* (2014.01)
  *H04N 19/91* (2014.01)

(56) References Cited

U.S. PATENT DOCUMENTS

| | | | |
|---|---|---|---|
| 2011/0096839 A1 | 4/2011 | Gomila et al. | |
| 2012/0121012 A1 | 5/2012 | Shiodera et al. | |
| 2012/0269258 A1* | 10/2012 | Yang | H04N 19/172 375/E7.126 |
| 2013/0083845 A1* | 4/2013 | Yu | H04N 19/126 375/240.03 |
| 2013/0188686 A1 | 7/2013 | Tourapis | |
| 2013/0314496 A1 | 11/2013 | Rossato et al. | |
| 2014/0050271 A1 | 2/2014 | Su et al. | |
| 2015/0117519 A1 | 4/2015 | Kim et al. | |
| 2015/0181237 A1* | 6/2015 | Tsukuba | H04N 19/134 382/233 |
| 2015/0189327 A1 | 7/2015 | Kondo | |
| 2015/0245050 A1 | 8/2015 | Tourapis et al. | |
| 2015/0256840 A1* | 9/2015 | Sato | H04N 19/46 375/240.03 |
| 2016/0019898 A1* | 1/2016 | Schreiner | G10L 21/0232 704/500 |
| 2018/0352225 A1* | 12/2018 | Guo | H04N 19/186 |
| 2019/0028703 A1* | 1/2019 | Tamse | H04N 19/176 |
| 2019/0052878 A1 | 2/2019 | Zhao et al. | |
| 2019/0058886 A1* | 2/2019 | Chen | H04N 19/30 |
| 2019/0132594 A1* | 5/2019 | Chung | H04N 19/147 |
| 2019/0320174 A1* | 10/2019 | Ramasubramonian | H04N 19/124 |
| 2019/0320193 A1* | 10/2019 | Mao | H04N 19/172 |
| 2020/0382806 A1* | 12/2020 | Zhang | H04N 19/14 |
| 2020/0389665 A1* | 12/2020 | Gao | H04N 19/513 |

FOREIGN PATENT DOCUMENTS

| | | |
|---|---|---|
| CN | 105637866 A | 6/2016 |
| GB | 2516022 A | 1/2015 |
| JP | 2007-528675 A | 10/2007 |
| JP | 2012-169762 A | 9/2012 |
| JP | 2015-508250 A | 3/2015 |
| WO | WO 2005/093661 A2 | 10/2005 |
| WO | WO 2009/151615 A1 | 12/2009 |
| WO | WO 2011/013192 A1 | 2/2011 |
| WO | WO 2012/148883 A1 | 11/2012 |
| WO | WO 2013/109631 A1 | 7/2013 |

OTHER PUBLICATIONS

"Information Technology—High Efficiency Coding and Media Delivery in Heterogeneous Environments Part 2: High Efficiency Video Coding", ISO/IEC 23008-2:2015(E), Second Edition May 1, 2015.

Tourapis, et al., "Reduced Resolution Update Mode for Enhanced Compression", Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, Document: JCTVC-H0447.

Joshi, et al., "High Efficiency Video Coding (HEVC) Screen Content Coding: Draft 4", Joint Collaborative Team on Video Coding (JCT-VC) of ITU-T SG 16 WP 3 and ISO/IEC JTC 1/SC 29/WG 11, 21st Meeting: Warsaw, PL, Jun. 19-Jun. 26, 2015, Document: JCTVC-U1005_r1.

Tourapis, Alexis Michael; "New Results on Reduced Resolution Update Mode"; ITU-T Video Coding Experts Group—SG16 Q.6; Document: VCEG-W04; Jul. 19-23, 2004; 12 pages.

International Patent Application No. PCT/US2017/044208; Int'l Search Report and the Written Opinion; dated Oct. 24, 2017; 15 pages.

International Patent Application No. PCT/US2017/044208; Int'l Preliminary Report on Patentability; dated Mar. 14, 2019; 8 pages.

Cho et al.; "Reisdual-downsampled stereoscopic video coding for mobile 3DTV service"; Joint Video Team; Document: JVT-Y052; Oct. 2007; 16 pages.

* cited by examiner

100

200

300

400

500

600

700

800

900

1000

1100

1200

1300

MULTIDIMENSIONAL QUANTIZATION TECHNIQUES FOR VIDEO CODING/DECODING SYSTEMS

CROSS REFERENCE TO RELATED APPLICATIONS

This application is a continuation of U.S. patent application Ser. No. 17/493,607 filed on Oct. 4, 2021, which is a continuation of U.S. patent application Ser. No. 15/250,608, filed on Aug. 29, 2016, now U.S. Pat. No. 11,153,594 issued Oct. 19, 2021, the entire contents are incorporated herein by reference.

BACKGROUND

The present disclosure relates to video compression and decompression techniques and, more particularly, to providing improved bandwidth control and coding performance for video compression and decompression systems.

Modern video compression systems, such as MPEG-4 AVC/H.264, MPEG-H part 2/HEVC/H.265, VP9, VP10, and others, employ a variety of tools, including spatial and temporal prediction, transform, quantization, in-loop filtering, and entropy encoding among others, as part of their coding process to achieve compression. Transform coding is commonly applied on residual data of a particular block size, after a prediction process is performed, to better de-correlate this information and to achieve energy compaction. The coefficients resulting after transform processing are quantized and then entropy encoded. This amounts to quantization in a single dimension. Uniform quantization is commonly used.

In earlier systems, the Discrete Cosine Transform ("DCT") was used, however, more recently, integer approximations of this transform, as well as of the Discrete Sine Transform ("DST"), are used. Other transforms such as the Walsh-Hadamard, Haar, etc. are also used. Different block sizes for both prediction, such as 4×4, 8×8, 16×16, 32×32, and 64×64 block predictions and transforms, among others, are commonly used. Non-squared transforms, as well as shape adaptive transforms are used also by some systems, while adaptive color space transforms on the residual data, prior to application of a transform, also may be applied.

For some scenarios, especially for high bitrates/low compression ratios, it was found that skipping the transformation process for a block may in fact be advantageous and provide better coding efficiency after quantization than transform coding. Such a scheme is adopted in HEVC and is named the "Transform Skip" coding mode. On the other hand, some codecs such as H.263+, apart from transform coding and quantization, also introduce the idea of reducing the resolution of the residual data before applying a transform and quantization. A decoder would then have to de-quantize the data, inverse the transformed coefficients, and then upscale the resulting block using predefined interpolation filters to finally reconstruct the residual signal. This residual signal was then added to the prediction signal to generate the final reconstructed block. Additional in-loop filtering may then be applied. This coding mode was named as the "Reduced Resolution Update" ("RRU") coding mode. In H.263, as well as when it was proposed in MPEG-4 AVC/H.264 and HEVC/H.265, this coding mode was applied to an entire image.

Existing coding techniques provide only limited flexibility to control in-loop quantization of video. Existing coders are able to quantize only a single characteristic of input data at a sub-frame/sub-picture level—quantization of transform coefficients, which is done at a block or macroblock level. Some types of quantization are not performed in-loop at all, and cannot be controlled at sub-frame levels. Accordingly, the inventors perceive a need for coding techniques that allow video coders to quantize input image data along multiple dimensions and to select quantization parameters for those dimensions at sub-frame levels.

DETAILED DESCRIPTION

Embodiments of the present disclosure provide video coding and decoding techniques that quantize input video along multiple dimensions. According to these techniques, pixel residuals may be generated from a comparison of an array of input data to an array of prediction data. The pixel residuals may be quantized in a first dimension. After the quantization, the quantized pixel residuals may be transformed to an array of transform coefficients. The transform coefficients may be quantized in a second dimension and entropy coded. Decoding techniques invert these processes. In still other embodiments, multiple quantizers may be provided upstream of the transform stage, either in parallel or in cascade, which provide greater flexibility to video coders to quantize data in different dimensions in an effort to balance the competing interest in compression efficiency and quality of recovered video. Parameter selection for the various quantizers may be made at sub-frame granularities.

Figure 1:
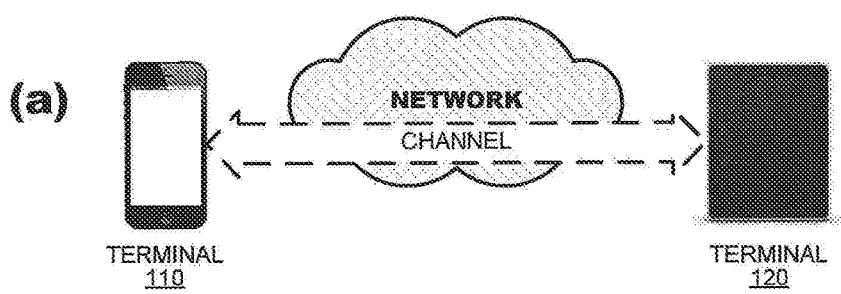
FIG. 1 is a simplified block diagram of a video delivery system according to an embodiment of the present disclosure.
Figure 1:
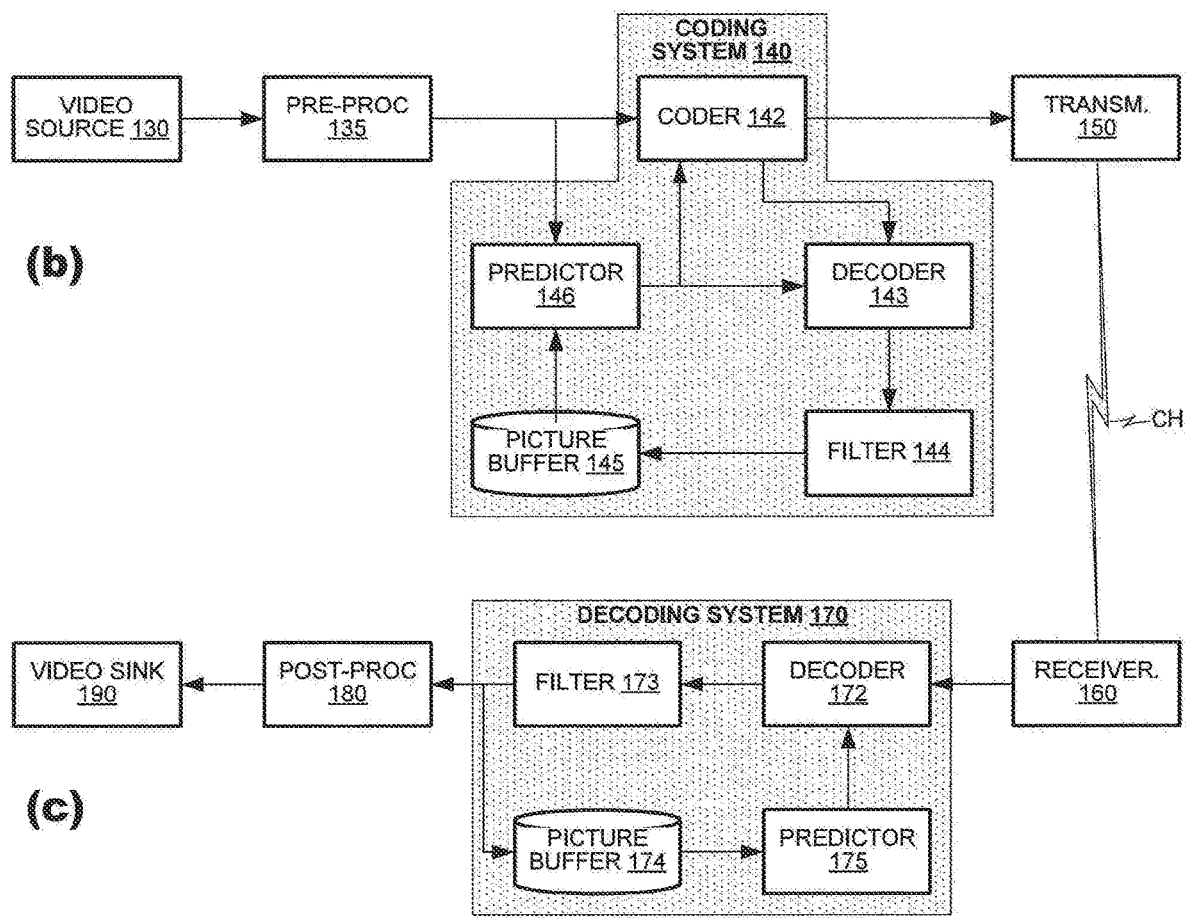

FIG. 1(*a*) illustrates a simplified block diagram of a video delivery system 100 according to an embodiment of the present disclosure. The system 100 may include a plurality of terminals 110, 150 interconnected via a network. The terminals 110, 150 may code video data for transmission to their counterparts via the network. Thus, a first terminal 110 may capture video data locally, code the video data and transmit the coded video data to the counterpart terminal 150 via a channel. The receiving terminal 150 may receive the coded video data, decode it, and render it locally, for example, on a display at the terminal 150. If the terminals are engaged in bidirectional exchange of video data, then the terminal 150 may capture video data locally, code the video data and transmit the coded video data to the counterpart terminal 110 via another channel. The receiving terminal 110 may receive the coded video data transmitted from terminal 150, decode it, and render it locally, for example, on its own display. The processes described can operate on both frame and field picture coding but, for simplicity, the present discussion will describe the techniques in the context of integral frames.

A video coding system 100 may be used in a variety of applications. In a first application, the terminals 110, 150 may support real time bidirectional exchange of coded video to establish a video conferencing session between them. In another application, a terminal 110 may code pre-produced video (for example, television or movie programming) and store the coded video for delivery to one or, often, many downloading clients (e.g., terminal 150). Thus, the video being coded may be live or pre-produced, and the terminal 110 may act as a media server, delivering the coded video according to a one-to-one or a one-to-many distribution model. For the purposes of the present discussion, the type of video and the video distribution schemes are immaterial unless otherwise noted.

In FIG. 1(*a*), the terminals 110, 150 are illustrated as smart phones and tablet computers, respectively, but the principles of the present disclosure are not so limited. Embodiments of the present disclosure also find application with computers (both desktop and laptop computers), computer servers, media players, dedicated video conferencing equipment and/or dedicated video encoding equipment.

The network represents any number of networks that convey coded video data between the terminals 110, 150, including for example wireline and/or wireless communication networks. The communication network may exchange data in circuit-switched or packet-switched channels. Representative networks include telecommunications networks, local area networks, wide area networks, and/or the Internet. For the purposes of the present discussion, the architecture and topology of the network are immaterial to the operation of the present disclosure unless otherwise noted.

FIG. 1(*b*) is a functional block diagram illustrating components of an encoding terminal. The encoding terminal may include a video source 130, a pre-processor 135, a coding system 140, and a transmitter 150. The video source 130 may supply video to be coded. The video source 130 may be provided as a camera that captures image data of a local environment or a storage device that stores video from some other source. The pre-processor 135 may perform signal conditioning operations on the video to be coded to prepare the video data for coding. For example, the preprocessor 135 may alter frame rate, frame resolution, and other properties of the source video. The preprocessor 135 also may perform filtering operations on the source video.

The coding system 140 may perform coding operations on the video to reduce its bandwidth. Typically, the coding system 140 exploits temporal and/or spatial redundancies within the source video. For example, the coding system 140 may perform motion compensated predictive coding in which video frame or field pictures are parsed into sub-units (called "pixel blocks," for convenience), and individual pixel blocks are coded differentially with respect to predicted pixel blocks, which are derived from previously-coded video data. A given pixel block may be coded according to any one of a variety of predictive coding modes, such as:

intra-coding, in which an input pixel block is coded differentially with respect to previously coded/decoded data of a common frame;
  single prediction inter-coding, in which an input pixel block is coded differentially with respect to data of a previously coded/decoded frame; and
  bi-predictive inter-coding, in which an input pixel block is coded differentially with respect to data of a pair of previously coded/decoded frames.
  Combined inter-intra coding in which an input pixel block is coded differentially with respect to data from both a previously coded/decoded frame and data from the current/common frame.
  Multi-hypothesis inter-intra coding, in which an input pixel block is coded differentially with respect to data from several previously coded/decoded frames, as well as potentially data from the current/common frame.

Pixel blocks also may be coded according to other coding modes such as the Transform Skip and RRU coding modes discussed earlier.

The coding system 140 may include a coder 142, a decoder 143, an in-loop filter 144, a picture buffer 145, and a predictor 146. The coder 142 may apply the differential coding techniques to the input pixel block using predicted pixel block data supplied by the predictor 146. The decoder 143 may invert the differential coding techniques applied by the coder 142 to a subset of coded frames designated as reference frames. The in-loop filter 144 may apply filtering techniques to the reconstructed reference frames generated by the decoder 143. The picture buffer 145 may store the reconstructed reference frames for use in prediction operations. The predictor 146 may predict data for input pixel blocks from within the reference frames stored in the picture buffer.

The transmitter 150 may transmit coded video data to a decoding terminal via a channel CH.

FIG. 1(*c*) is a functional block diagram illustrating components of a decoding terminal according to an embodiment of the present disclosure. The decoding terminal may include a receiver 160 to receive coded video data from the channel, a video decoding system 170 that decodes coded data; a post-processor 180, and a video sink 190 that consumes the video data.

The receiver 160 may receive a data stream from the network and may route components of the data stream to appropriate units within the terminal 200. Although FIGS. 1(*b*) and 1(*c*) illustrate functional units for video coding and decoding, terminals 110, 120 typically will include coding/decoding systems for audio data associated with the video and perhaps other processing units (not shown). Thus, the receiver 160 may parse the coded video data from other elements of the data stream and route it to the video decoder 170.

The video decoder 170 may perform decoding operations that invert coding operations performed by the coding system 140. The video decoder may include a decoder 172, an in-loop filter 173, a picture buffer 174, and a predictor 175. The decoder 172 may invert the differential coding techniques applied by the coder 142 to the coded frames. The in-loop filter 144 may apply filtering techniques to reconstructed frame data generated by the decoder 172. For example, the in-loop filter 144 may perform various filtering operations (e.g., de-blocking, de-ringing filtering, sample adaptive offset processing, and the like). The filtered frame data may be output from the decoding system. The picture buffer 174 may store reconstructed reference frames for use in prediction operations. The predictor 175 may predict data for input pixel blocks from within the reference frames stored by the picture buffer according to prediction reference data provided in the coded video data.

The post-processor 180 may perform operations to condition the reconstructed video data for display. For example, the post-processor 180 may perform various filtering operations (e.g., de-blocking, de-ringing filtering, and the like), which may obscure visual artifacts in output video that are generated by the coding/decoding process. The post-processor 180 also may alter resolution, frame rate, color space, etc. of the reconstructed video to conform it to requirements of the video sink 190.

The video sink 190 represents various hardware and/or software components in a decoding terminal that may consume the reconstructed video. The video sink 190 typically may include one or more display devices on which reconstructed video may be rendered. Alternatively, the video sink 190 may be represented by a memory system that stores the reconstructed video for later use. The video sink 190 also may include one or more application programs that process the reconstructed video data according to controls provided in the application program. In some embodiments, the video sink may represent a transmission system that transmits the reconstructed video to a display on another device, separate from the decoding terminal; for example, reconstructed video generated by a notebook computer may be transmitted to a large flat panel display for viewing.

The foregoing discussion of the encoding terminal and the decoding terminal (FIGS. 1(b) and 1(c)) illustrates operations that are performed to code and decode video data in a single direction between terminals, such as from terminal 110 to terminal 150 (FIG. 1(a)). In applications where bidirectional exchange of video is to be performed between the terminals 110, 150, each terminal 110, 150 will possess the functional units associated with an encoding terminal (FIG. 1(b)) and each terminal 110, 150 also will possess the functional units associated with a decoding terminal (FIG. 1(c)). Indeed, in certain applications, terminals 110, 150 may exchange multiple streams of coded video in a single direction, in which case, a single terminal (say terminal 110) will have multiple instances of an encoding terminal (FIG. 1(b)) provided therein. Such implementations are fully consistent with the present discussion.

Figure 2:
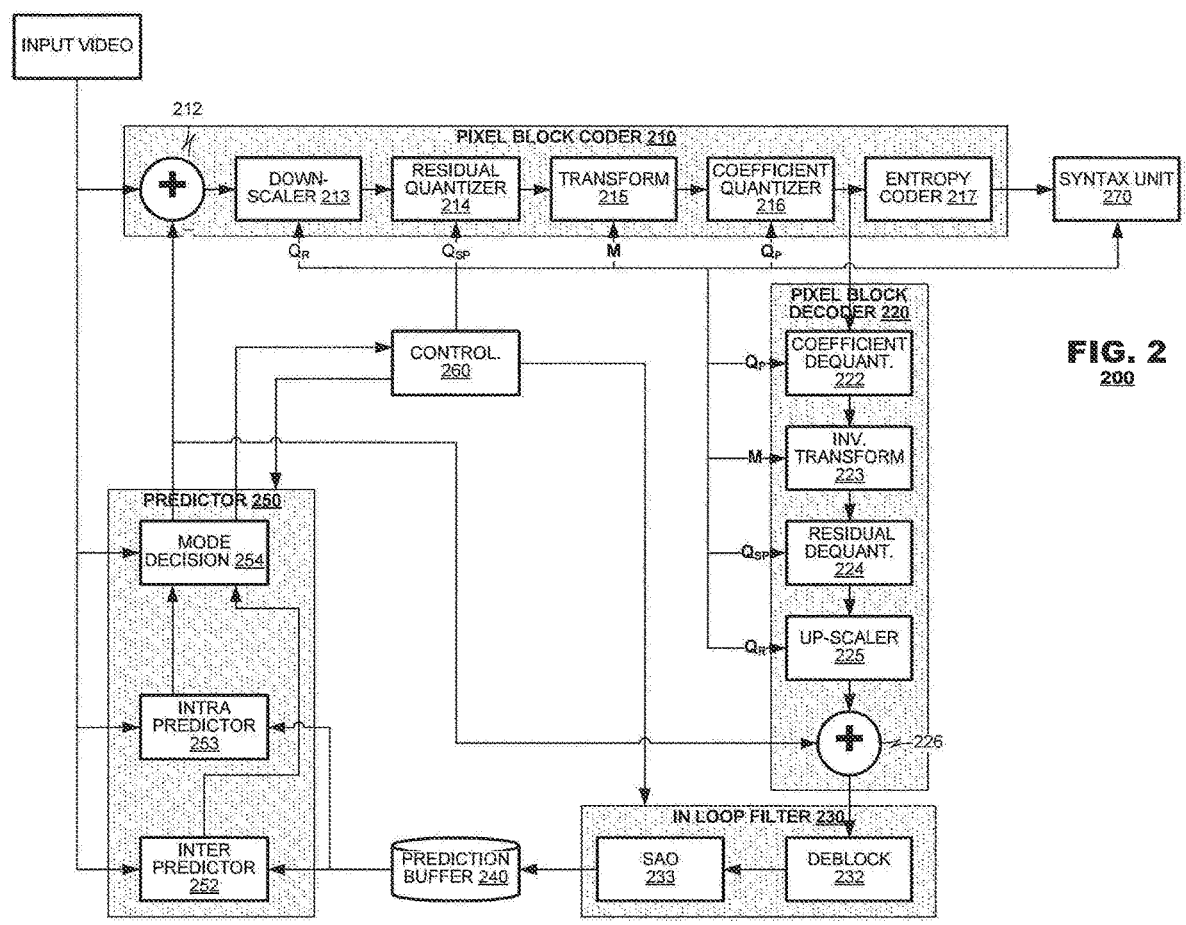
FIG. 2 is a functional block diagram of a coding system according to an embodiment of the present disclosure.

FIG. 2 is a functional block diagram of a coding system 200 according to an embodiment of the present disclosure. The system 200 may include a pixel block coder 210, a pixel block decoder 220, an in-loop filter system 230, a prediction buffer 240, a predictor 250, a controller 260, and a syntax unit 270. The pixel block coder and decoder 210, 220 and the predictor 250 may operate iteratively on individual pixel blocks of a frame. The predictor 250 may predict data for use during coding of a newly-presented input pixel block. The pixel block coder 210 may code the new pixel block by predictive coding techniques and present coded pixel block data to the syntax unit 270. The pixel block decoder 220 may decode the coded pixel block data, generating decoded pixel block data therefrom. The in-loop filter 230 may perform various filtering operations on decoded frame data that is assembled from the decoded pixel blocks obtained by the pixel block decoder 220. The filtered frame data may be stored in the prediction buffer 240 where it may be used as a source of prediction of a later-received pixel block. The syntax unit 270 may assemble a data stream from the coded pixel block data which conforms to a governing coding protocol.

The pixel block coder 210 may include a subtractor 212, a downscaler 213, a residual quantizer 214, a transform unit 215, a coefficient quantizer 216, and an entropy coder 217. The pixel block coder 210 may accept pixel blocks of input data at the subtractor 212. The subtractor 212 may receive predicted pixel blocks from the predictor 250 and generate an array of pixel residuals therefrom representing a difference between the input pixel block and the predicted pixel block. The downscaler 213 may perform spatial resolution reduction to the residual data output from the subtractor 212. The residual quantizer 214 may perform quantization of the sample data output from the downscaler 213. The quantizer 214 may be a uniform or a non-uniform quantizer. The transform unit 215 may apply a transform to the sample data output from the residual quantizer 214, to convert data from the pixel domain to a domain of transform coefficients. The coefficient quantizer 216 may perform quantization of transform coefficients output by the transform unit 215. The quantizer 216 may be a uniform or a non-uniform quantizer. The entropy coder 217 may reduce bandwidth of the output of the coefficient quantizer by coding the output, for example, by variable length code words.

During operation, the downscaler 213, the residual quantizer 214 and the coefficient quantizer 216 may operate according to coding parameters that govern each unit's operation. For example, the downscaler 213 may operate according to a resolution quantization parameter ($Q_R$) that determines a level of downscaling to apply to its input pixel block. Similarly, the coefficient quantizer 214 may operate according to a coefficient quantization parameter ($Q_{SP}$) that determines a level of quantization to apply to residual samples input to the quantizer 214. And the coefficient quantizer 216 may operate according to a coefficient quantization parameter ($Q_P$) that determines a level of quantization to apply to the transform coefficients input to the coefficient quantizer 216. These quantizers may operate according to a signal mode $M_{QP}$ and $M_{QR}$ that specifies whether the quantizers are uniform or non-uniform quantizers. Thus, each of these quantizers 213, 214, 216 operates in different dimensions because they quantize different characteristics of the image data. The quantized dimensions do not have to be orthogonal to each other. The quantization parameters $Q_R$, $Q_{SP}$, and $Q_P$ may be determined by a controller 260 and may be signaled in coded video data output by the coding system 200, either expressly or impliedly.

In an embodiment, the quantization parameters $Q_R$, $Q_{SP}$, and $Q_P$ may be applied to their respective input data as multi-value quantization parameters, which may vary, for example, across different pixel locations within a pixel-domain pixel block or across different coefficient locations within a transform-domain pixel block. Thus, the quantization parameters $Q_R$, $Q_{SP}$, and $Q_P$ may be provided as quantization parameters arrays.

The transform unit 215 may operate in a variety of transform modes as events warrant. For example, the transform unit 215 may be selected to apply a DCT, a DST, a Walsh-Hadamard transform, a Haar transform, a Daubechies wavelet transform, or the like. In an embodiment, a controller 260 may select a coding mode M to be applied by the transform unit 215 and may configure the transform unit 215 accordingly. The coding mode M also may be signaled in the coded video data, either expressly or impliedly.

The pixel block decoder 220 may invert coding operations of the pixel block coder 210. For example, the pixel block decoder 220 may include a coefficient dequantizer 222, an inverse transform unit 223, a residual dequantizer 224, an upscaler 225, and an adder 226. The pixel block decoder 220 may take its input data from an output of the coefficient quantizer 216. Although permissible, the pixel block decoder 220 need not perform entropy decoding of entropy-coded data since entropy coding is a lossless event. The coefficient dequantizer 222 may invert operations of the coefficient quantizer 216 of the pixel block coder 210. The dequantizer 222 may perform uniform or non-uniform de-quantization as specified by the decoded signal $M_{QP}$. Similarly, the inverse transform unit 223, residual dequantizer 224, and upscaler 225 may invert operations of the transform unit 215, the residual quantizer 214, and the downscaler 213, respectively. They may use the same quantization parameters $Q_R$, $Q_{SP}$, and $Q_P$ and transform mode M as their counterparts in the pixel block coder 210. The residual dequantizer 224 may perform uniform or non-uniform de-quantization as specified by the decoded signal $M_{QR}$. Operations of the downscaler 213, the residual quantizer 214, and the coefficient quantizer 216 likely will truncate data in various respects and, therefore, data recovered by the coefficient dequantizer 222, the residual dequantizer 224, and the upscaler 225 likely will possess coding errors when compared to the data presented to their counterparts in the pixel block coder 210.

The adder 226 may invert operations performed by the subtractor 212. It may receive the same prediction pixel block from the predictor 250 that the subtractor 212 used in generating residual signals. The adder 226 may add the prediction pixel block to reconstructed residual values output by the upscaler 225 and may output reconstructed pixel block data.

The in-loop filter 230 may perform various filtering operations on recovered pixel block data. For example, the in-loop filter 230 may include a deblocking filter 232 and a sample adaptive offset ("SAO") filter 233. The deblocking filter 232 may filter data at seams between reconstructed pixel blocks to reduce discontinuities between the pixel blocks that arise due to coding. SAO filters may add offsets to pixel values according to an SAO "type," for example, based on edge direction/shape and/or pixel/color component level. The in-loop filter 230 may operate according to parameters that are selected by the controller 260.

The prediction buffer 240 may store filtered pixel data for use in later prediction of other pixel blocks. Different types of prediction data are made available to the predictor 250 for different prediction modes. For example, for an input pixel block, intra prediction takes a prediction reference from decoded data of the same frame in which the input pixel block is located. Thus, the prediction buffer 240 may store decoded pixel block data of each frame as it is coded. For the same input pixel block, inter prediction may take a prediction reference from previously coded and decoded frame(s) that are designated as "reference frames." Thus, the prediction buffer 240 may store these decoded reference frames.

As discussed, the predictor 250 may supply prediction data to the pixel block coder 210 for use in generating residuals. The predictor 250 may include an inter predictor 252, an intra predictor 253 and a mode decision unit 254. The inter predictor 252 may receive pixel block data representing a new pixel block to be coded and may search the prediction buffer 240 for pixel block data from reference frame(s) for use in coding the input pixel block. The inter predictor 252 may support a plurality of prediction modes, such as P mode coding and B mode coding. The inter predictor 252 may select an inter prediction mode and supply prediction data that provides a closest match to the input pixel block being coded. The inter predictor 252 may generate prediction reference indicators, such as motion vectors, to identify which portion(s) of which reference frames were selected as source(s) of prediction for the input pixel block.

The intra predictor 253 may support Intra (I) mode coding. The intra predictor 253 may search from among coded pixel block data from the same frame as the pixel block being coded that provides a closest match to the input pixel block. The intra predictor 253 also may generate prediction reference indicators to identify which portion of the frame was selected as a source of prediction for the input pixel block.

The mode decision unit 254 may select a final coding mode to be applied to the input pixel block. Typically, the mode decision unit 254 selects the prediction mode that will achieve the lowest distortion when video is decoded given a target bitrate. Exceptions may arise when coding modes are selected to satisfy other policies to which the coding system 200 adheres, such as satisfying a particular channel behavior, or supporting random access or data refresh policies. The mode decision unit 254 may output the prediction data to the pixel block coder and decoder 210, 220 and may supply to the controller 260 an identification of the selected prediction mode along with the prediction reference indicators corresponding to the selected mode.

The controller 260 may control overall operation of the coding system 200. The controller 260 may select operational parameters for the pixel block coder 210 and the predictor 250 based on analyses of input pixel blocks and also external constraints, such as coding bitrate targets and other operational parameters. As is relevant to the present discussion, when it selects quantization parameters such as the downscaling parameter $Q_R$, the residual quantization parameter $Q_{SP}$, the coefficient quantizer $Q_P$, the use of uniform or non-uniform quantizers, and/or the transform mode M, it may provide those parameters to the syntax unit 270, which may include data representing those parameters in the data stream of coded video data output by the system 200. The controller 260 also may determine that no quantization should be applied by one or more quantizer units (say, the coefficient quantizer 216), in which case, the controller 260 may disable the quantizer. As discussed above, the controller 260 also may determine a mode of operation of the transform unit 215.

As discussed, quantization parameters $Q_R$, $Q_{SP}$, and/or $Q_P$ need not be provided as single values that are applied uniformly to all pixels of a pixel block but, instead, can be provided as respective arrays of quantization parameters whose values change at each pixel position. In one embodiment, a variety of quantizer arrays may be defined according to a predetermined protocol, each having respective quantization values at different pixel positions; during operation, a controller 260 may identify which array to use by providing an index or other identifier.

In another embodiment, quantization parameters $Q_R$, $Q_{SP}$, and/or $Q_P$ (whether single valued or an array of values, may be derived from characteristics of image data. For example, the quantization parameters $Q_{SP}$ may be selected based on the intensity of the prediction pixel values that correspond to the pixel residuals. In this case, the value of $Q_{SP}$ may vary for every pixel according to the intensity value of the predictor, e.g. it could be higher for a sample with a larger predictor value than a sample with a smaller predictor value.

These quantization parameters could be defined using a linear, i.e. a scaler, formulation, or use a more complex non-linear/non-uniform formulation.

In one embodiment, a quantizer may be expressed by a predetermined function of the form $q(i,j)=f_k(p(i,j), i, j)$, where q represents the quantizer at issue, i and j represent locations of the value (either the pixel-domain value or the transform-domain value) within a pixel block being quantized, p(i,j) represents the pixel intensity value being quantized, and $f_k$ represents a function relating p, i and j to q. As part of signaling, the controller 260 may provide data identifying the function being used, and any other data on which the respective function operates (for example, any scalars and offsets that may be at work in the respective function).

The quantization process could also be specified using a look up table form (not shown). The look-up table form may involve the use of interpolation techniques to determine the quantization/dequantization process of certain values that are not contained in the look-up table. Alternatively, the quantization parameters $Q_R$ and/or $Q_{SP}$, $Q_P$ may be predicted from quantization parameters of previously-coded neighboring pixel blocks. In a further embodiment, a first set of quantization parameters $Q_R$ and/or $Q_{SP}$, $Q_P$ may be signaled in a higher level construct of a coding sequence (for example, a frame or slice header) and alterations to the signaled set of quantization parameters $Q_R$ and/or $Q_{SP}$, $Q_P$ may be signaled on a pixel block-by-pixel block basis as the pixel blocks of the construct are coded.

During operation, the controller 260 may revise operational parameters of the quantizers 213, 214, and 216 and the transform unit 215 at different granularities of image data, either on a per pixel block basis or on a larger granularity (for example, per frame, per slice, per largest coding unit ("LCU") or another region). In an embodiment, the quantization parameters may be revised on a per-pixel basis within a coded frame.

Additionally, as discussed, the controller 260 may control operation of the in-loop filter 230 and the prediction unit 250. Such control may include, for the prediction unit 250, mode selection (lambda, modes to be tested, search windows, distortion strategies, etc.), and, for the in-loop filter 230, selection of filter parameters, reordering parameters, weighted prediction, etc.

Figure 3:
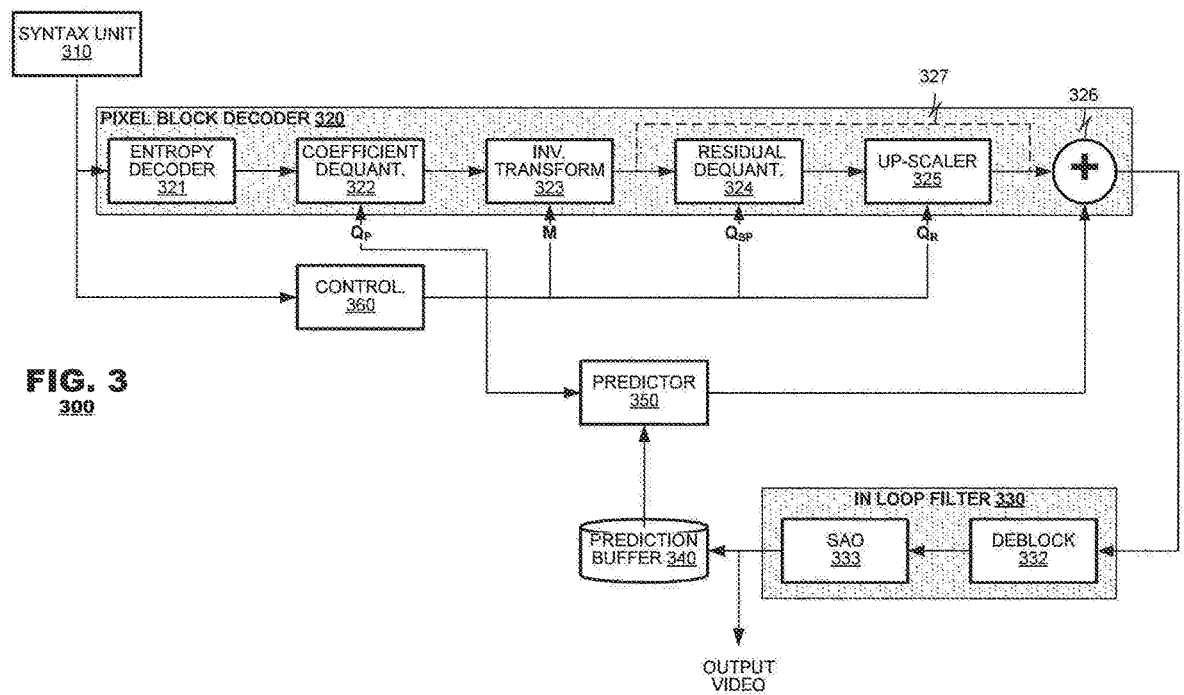
FIG. 3 is a functional block diagram of a decoding system according to an embodiment of the present disclosure.

FIG. 3 is a functional block diagram of a decoding system 300 according to an embodiment of the present disclosure. The decoding system 300 may include a syntax unit 310, a pixel-block decoder 320, an in-loop filter 330, a prediction buffer 340 and a predictor 350. The syntax unit 310 may receive a coded video data stream and may parse the coded data into its constituent parts. Data representing coding parameters may be furnished to the controller 360 while data representing coded residuals (the data output by the pixel block coder 210 of FIG. 2) may be furnished to the pixel block decoder 320. The pixel block decoder 320 may invert coding operations provided by the pixel block coder (FIG. 2). The in-loop filter 330 may filter reconstructed pixel block data. The reconstructed pixel block data may be assembled into frames for display and output from the decoding system 200 as output video. The frames also may be stored in the prediction buffer 340 for use in prediction operations. The predictor 350 may supply prediction data to the pixel block decoder 320 as determined by coding data received in the coded video data stream.

The pixel block decoder 320 may include an entropy decoder 321, a coefficient dequantizer 322, an inverse transform unit 323, a residual dequantizer 324, an upscaler 325, and an adder 326. The entropy decoder 321 may perform entropy decoding to invert processes performed by the entropy coder 217 (FIG. 2). The coefficient dequantizer 322 may invert operations of the coefficient quantizer 216 of the pixel block coder 210 (FIG. 2). Similarly, the inverse transform unit 323, residual dequantizer 324, and upscaler 325 may invert operations of the transform unit 215, the residual quantizer 214, and the downscaler 213 (FIG. 2), respectively. They may use the quantization parameters $Q_R$, $Q_{SP}$, and $Q_P$, as well as the quantizer mode types $M_{QP}$ and $M_{QR}$, that are provided in the coded video data stream. Because operations of the downscaler 213, the residual quantizer 214, and the coefficient quantizer 216 truncate data in various respects, the data recovered by the coefficient dequantizer 322, the residual dequantizer 324, and the upscaler 325 likely will possess coding errors when compared to the input data presented to their counterparts in the pixel block coder 210 (FIG. 2).

The adder 326 may invert operations performed by the subtractor 212 (FIG. 2). It may receive a prediction pixel block from the predictor 350 as determined by prediction references in the coded video data stream. The adder 326 may add the prediction pixel block to reconstructed residual values output by the upscaler 325 and may output reconstructed pixel block data.

The in-loop filter 330 may perform various filtering operations on reconstructed pixel block data. As illustrated, the in-loop filter 330 may include a deblocking filter 332 and an SAO filter 333. The deblocking filter 332 may filter data at seams between reconstructed pixel blocks to reduce discontinuities between the pixel blocks that arise due to coding. SAO filters may add offset to pixel values according to an SAO type, for example, based on edge direction/shape and/or pixel level. Other types of in-loop filters may also be used in a similar manner. Operation of the deblocking filter 332 and the SAO filter 333 ideally would mimic operation of their counterparts in the coding system 200 (FIG. 2). Thus, in the absence of transmission errors or other abnormalities, the decoded frame data obtained from the in-loop filter 330 of the decoding system 300 would be the same as the decoded frame data obtained from the in-loop filter 230 of the coding system 200 (FIG. 2); in this manner, the coding system 200 and the decoding system 300 should store a common set of reference pictures in their respective prediction buffers 240, 340.

The prediction buffer 340 may store filtered pixel data for use in later prediction of other pixel blocks. The prediction buffer 340 may store decoded pixel block data of each frame as it is coded for use in intra prediction. The prediction buffer 340 also may store decoded reference frames.

As discussed, the predictor 350 may supply prediction data to the pixel block decoder 320. The predictor 350 may supply predicted pixel block data as determined by the prediction reference indicators supplied in the coded video data stream.

The controller 360 may control overall operation of the coding system 300. The controller 360 may set operational parameters for the pixel block decoder 320 and the predictor 350 based on parameters received in the coded video data stream. As is relevant to the present discussion, these operational parameters may include quantization parameters such as the downscaling parameter $Q_R$, the residual quantization parameter $Q_{SP}$ and/or the coefficient quantizer $Q_P$ and modes of operation M for the inverse transform unit 315. As discussed, the received parameters may be set at various granularities of image data, for example, on a per pixel block basis, a per frame basis, a per slice basis, a per LCU basis, or based on other types of regions defined for the input image.

Figure 4:
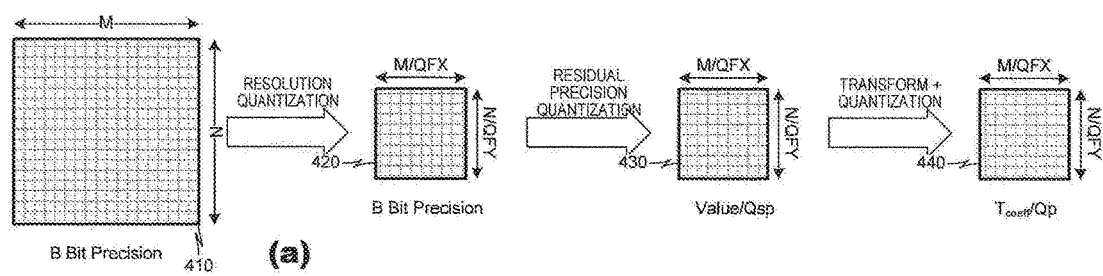
FIG. 4 illustrates processing undertaken by an exemplary pixel block according to the coding system of FIG. 2 and the decoding system of FIG. 3.
Figure 4:
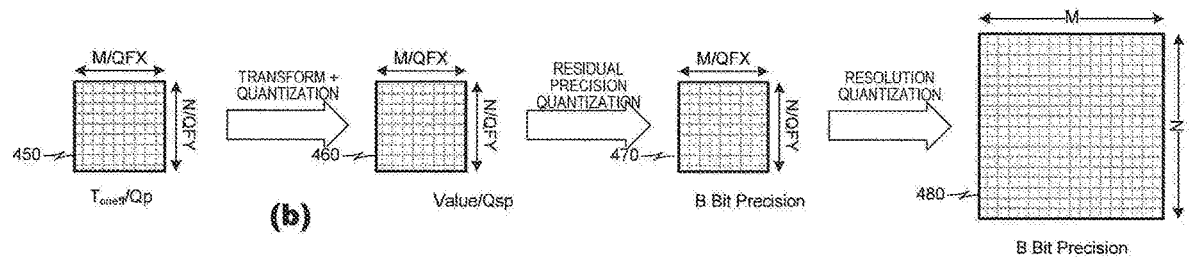

FIG. 4 illustrates processing undertaken by an exemplary pixel block according to the coding system 200 of FIG. 2 and the decoding system 300 of FIG. 3. Initially, as shown in FIG. 4(a), the pixel block 310 may be an M by N array of pixels, each represented with a bit depth B per color component. After resolution quantization (downscaling), the pixel block 320 may be an $M/QF_X$ by $N/QF_Y$ array of pixels, still having a bit depth B per color component. After coefficient quantization, the pixel block 330 may be an $M/QF_X$ by $N/QF_Y$ array of pixels, with an altered bit depth. Here, sample values are divided from their original values by a sample precision quantization value ($Q_{SP}$). After transform and quantization, the pixel block 340 may be an $M/QF_X$ by $N/QF_Y$ array of transform coefficients, whose values would have been quantized by a quantization parameter QP.

FIG. 4(b) illustrates processing undertaken by the coded pixel block during decode. Initially, the coded pixel block 350 may be an $M/QF_X$ by $N/QF_Y$ array of transform coefficients, whose values will be quantized by the quantization parameter $Q_P$ shown in FIG. 4(a). After inverse transform and quantization, the pixel block 360 may be an $M/QF_X$ by $N/QF_Y$ array of pixels, whose values correspond to those of pixel block 330 with losses induced by the quantization parameter $Q_P$. After sample precision quantization, the pixel block 370 may be an $M/QF_X$ by $N/QF_Y$ array of pixels, having a bit depth B per color component, albeit with further losses induced by the quantization parameter $Q_{SP}$. After inverse resolution quantization (upscaling), the pixel block 3870 may be an M by N array of pixels, each represented with a bit depth B per color component, again with coding losses.

As illustrated in FIG. 4, the embodiments of FIGS. 2 and 3 provide for quantization of image data along several dimensions. In this embodiment, quantization may be applied to resolution of image data and bit depth, in addition to quantization of coefficient transforms. These techniques, therefore, provide greater flexibility to coding/decoding systems to achieve bandwidth compression and yet retain coding quality.

Figure 5:
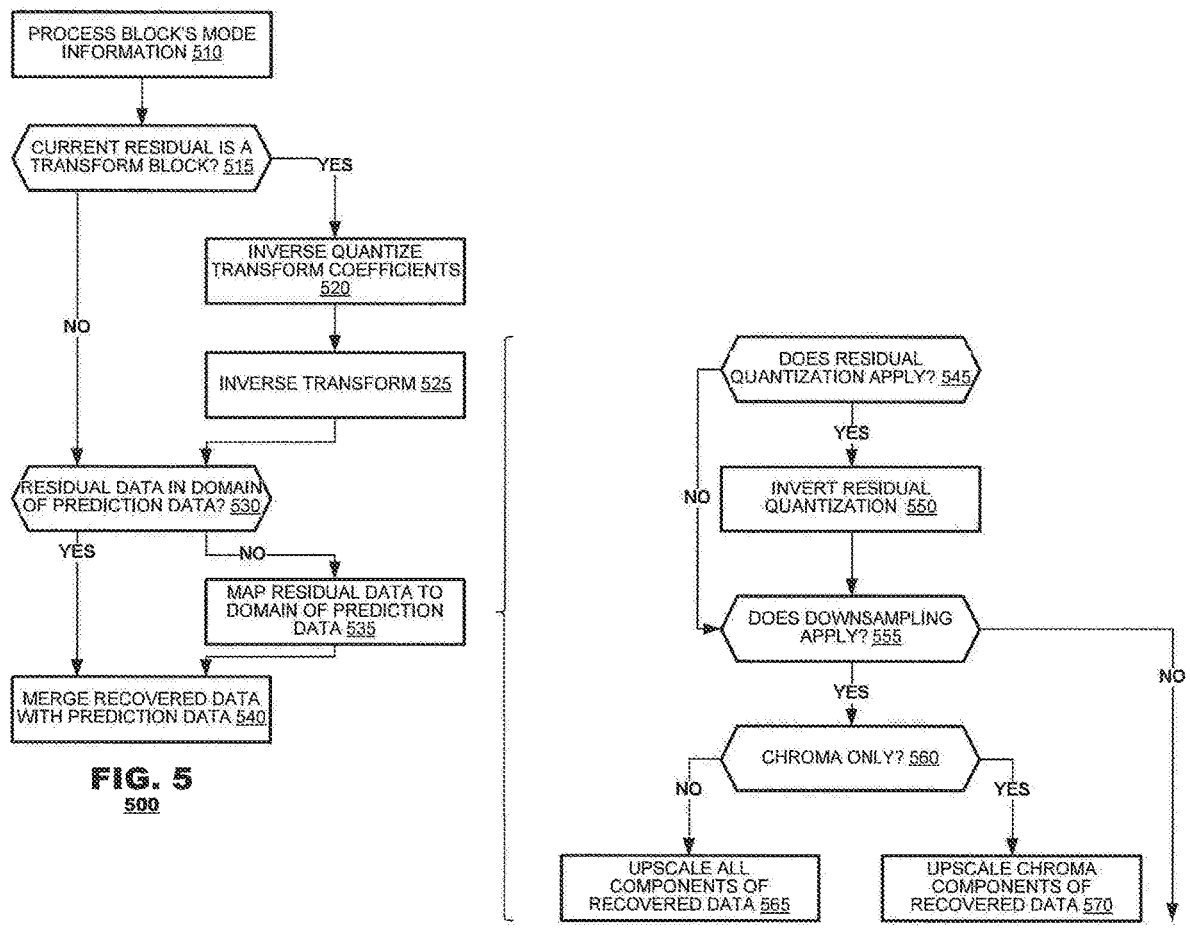
FIG. 5 illustrates a decoding method according to an embodiment of the present disclosure.

FIG. 5 illustrates a decoding method 500 according to an embodiment of the present disclosure. The method 500 may operate on coded video data on a pixel block-by-pixel block basis. The method 500 may process metadata provided with the coded video data to determine which coding mode(s) were applied to code the pixel block being decoded (box 510). The method may determine, from the coding mode data, whether coded pixel block residuals are part of a transform block (box 515). If so, the method 500 may dequantize the transform coefficients according to a quantization parameter ($Q_P$) provided with the coded video data (box 520) and may apply an inverse transform according to a transform mode M identified by the coded video data (box 525). The quantization parameter $Q_P$ and transform mode M may be identified either expressly or impliedly by the coded video data.

At box 530, the method 500 may determine whether residual data, which either was present at box 515 or was reconstructed at box 525, is in the domain of the prediction data. If not, then the method 500 may map the residual data to the domain of the prediction data, which is pixel domain (box 535). Thereafter, or if the residual data was determined at box 530 to be in the domain of the prediction data already, the method 500 may merge prediction data with the data reconstructed by processing of boxes 510-535 (box 540).

Mapping of residual data to the domain of the prediction data may occur by inverting quantization operations that were applied during coding of the pixel block. FIG. 5 illustrates exemplary dequantization operations that may be employed when decoding coded video data generated by the coding system 200 of FIG. 2. Thus, the method 500 may determine whether residual quantization applies (box 545) and, if so, the method 500 may invert residual quantization (box 550) using parameters $Q_{SP}$ provided with the coded video data. Similarly, the method 500 may determine whether downsampling applies (box 555) and, if so, whether downsampling was applied only to chroma or to all color components (box 560). If downsampling was applied to all components, then the method 500 may upscale all components of the reconstructed data (box 565). If downsampling was applied only to chroma, then the method 500 may upscale chroma components of the reconstructed data (box 570). Again, quantization parameters $Q_R$ for downscaling may be provided with coded video, either expressly or impliedly.

Figure 6:
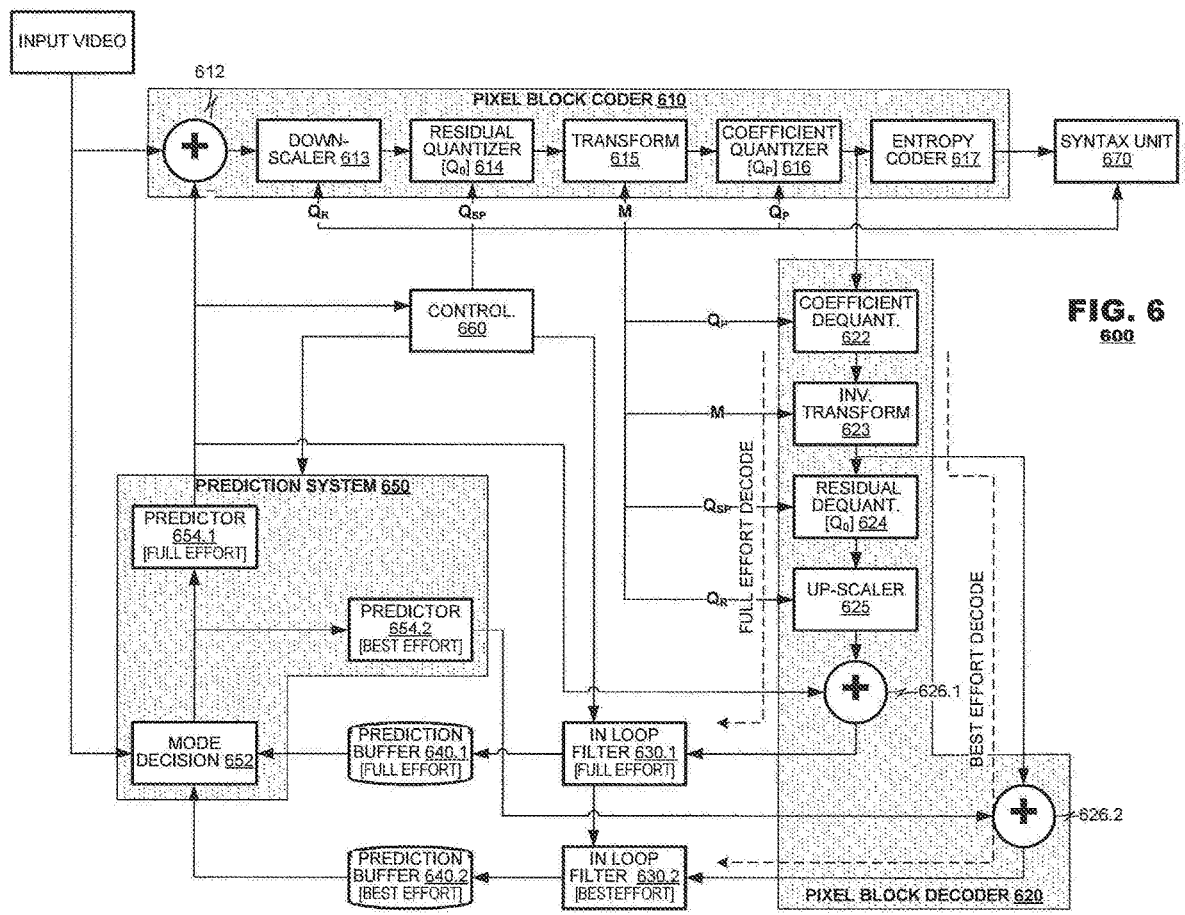
FIG. 6 is a functional block diagram of a coding system according to an embodiment of the present disclosure.

FIG. 6 is a functional block diagram of a coding system 600 according to an embodiment of the present disclosure. The system 600 may include a pixel block coder 610, a pixel block decoder 620, a pair of in-loop filter systems 630.1, 630.2, a pair of prediction buffers 640.1, 640.2, a prediction system 650, a controller 660, and a syntax unit 670. As with the prior embodiment, the pixel block coder and decoder 610, 620 and the prediction system 650 may operate iteratively on individual pixel blocks of image data but the in-loop filters 630.1, 630.2 and the prediction buffers 640.1, 640.2 may operate on larger units of data. The prediction system 650 may predict data for use during coding of a newly-presented input pixel block.

The pixel block coder 610 may code the new pixel block by predictive coding techniques and present coded pixel block data to the syntax unit 670. The syntax unit 670 may build a transmission bit stream from the coded video data and other sources (not shown), for example, sources of coded audio data and/or application data. The syntax unit 670 may assemble a data stream from the coded pixel block data which conforms to a governing coding protocol.

The pixel block decoder 620 may be a decoder, local to the pixel block coder 610, that decodes the coded pixel block data, generating decoded pixel block data therefrom. In this embodiment, the pixel block decoder 620 may generate two versions of decoded pixel blocks. A first version may be generated from a limited decode of the coded pixel block data (called a "best effort" decode, for convenience), for example, by inverting coefficient sampling, inverting a coefficient transform process performed by the pixel block coder 610 and performing a limited prediction operation. A second version may be generated from inverting all coding processes performed by the pixel block coder 610 (a "full effort" decode), including, for example, downsampling, residual quantization and the like. The pixel block decoder 620 may output the two versions of decoded pixel blocks to respective in-loop filters 630.1, 630.2.

The in-loop filters 630.1, 630.2 and prediction buffers 640.1, 640.2 may be provided in paired relationships. The first in-loop filter 630.1 and prediction buffer 640.1 may operate on the decoded pixel block data output from full decoding operations performed by the pixel block decoder 620. The second in-loop filter 630.2 and prediction buffer 640.2 may operate on the decoded pixel block data output from limited decoding operations performed by the pixel block decoder 620. In each case, the in-loop filters 630.1, 630.2 may perform various filtering operations on their respective decoded frame data. The filtered frame data generated by the in-loop filters 630.1, 630.2 may be stored in their respective prediction buffers 640.1, 640.2 where they may be used as sources of prediction of later-received pixel blocks.

The prediction system 650 may generate prediction data for an input pixel block by performing a motion search within the prediction buffer 640.1 associated with the full effort decode. The prediction system 650 may output the prediction data from the prediction buffer 640.1 to the pixel block coder 610 and to the pixel block decoder 620 for use in the full effort decode processes. The prediction system 650 also may supply a corresponding pixel block from the prediction buffer 640.2 to the pixel block decoder 620 for use in the best effort decode.

The pixel block coder 610 may include a subtractor 612, a downscaler 613, a residual quantizer 614, a transform unit 615, a coefficient quantizer 616, and an entropy coder 617. The pixel block coder 610 may accept pixel blocks of input data at the subtractor 612. The subtractor 612 may receive predicted pixel blocks from the prediction system 650 and generate an array of pixel residuals therefrom representing pixel-wise differences between the input pixel block and the predicted pixel block. The downscaler 613 may perform spatial resolution reduction to the residual data output from the subtractor 612. The residual quantizer 614 may perform quantization of the sample data output from the downscaler 613. The transform unit 615 may apply a transform to the sample data output from the residual quantizer 614, to convert data from the pixel domain to a domain of transform coefficients. The coefficient quantizer 616 may perform quantization of transform coefficients output by the transform unit 615. The entropy coder 617 may reduce bandwidth of the output of the coefficient quantizer by coding the output, for example, by variable length code words.

During operation, the downscaler 613, the residual quantizer 614, and the coefficient quantizer 616 may operate according to coding parameters that govern each unit's operation. For example, the downscaler 613 may operate according to a resolution quantization parameter $Q_R$ that determines a level of downscaling to apply to its input pixel block. Similarly, the residual quantizer 614 may operate according to a residual quantization parameter $Q_{SP}$ that determines a level of quantization to apply to residual samples input to the residual quantizer 614. And the coefficient quantizer 616 may operate according to a coefficient quantization parameter $Q_P$ that determines a level of quantization that is applied to the transform coefficients input to the coefficient quantizer 616. As with the prior embodiment, each of these quantizers 613, 614, 616 operate in different dimensions because they quantize different characteristics of the image data; the quantized dimensions do not have to be orthogonal to each other. The quantization parameters $Q_R$, $Q_{SP}$, and $Q_P$ may be determined by a controller 660 and may be signaled in coded video data output by the coding system 600, either expressly or impliedly. These quantizers may also operate in a uniform or non-uniform manner.

The transform unit 615 may operate in a variety of transform modes as events warrant. For example, the transform unit 615 may be selected to apply a DCT, a DST, a Walsh-Hadamard transform, a Haar transform, a Daubechies wavelet transform, or the like. In an embodiment, a controller 660 may select a coding mode M to be applied by the transform unit 615 and may configure the transform unit 615 accordingly. The coding mode M also may be signaled in the coded video data, either expressly or impliedly.

The pixel block decoder 620 may invert coding operations of the pixel block coder 610. For example, the pixel block decoder 620 may include a coefficient dequantizer 622, an inverse transform unit 623, a residual dequantizer 624, an upscaler 625, and a pair of adders 626.1, 626.2. The pixel block decoder 620 may take its input data from an output of the coefficient quantizer 616. Although permissible, the pixel block decoder 620 need not perform entropy decoding of entropy-coded data since entropy coding is a lossless event. The coefficient dequantizer 622 may invert operations of the coefficient quantizer 616 of the pixel block coder 610. Similarly, the inverse transform unit 623, residual dequantizer 624, and upscaler 625 may invert operations of the transform unit 615, the residual quantizer 614, and the downscaler 613, respectively. They may use the same quantization parameters $Q_R$, $Q_{SP}$, and $Q_P$ and transform mode M as their counterparts in the pixel block coder 610. Operations of the downscaler 613, the residual quantizer 614, and the coefficient quantizer 616 likely will truncate data in various respects and, therefore, data recovered by the coefficient dequantizer 622, the residual dequantizer 624, and the upscaler 625 likely will possess coding errors when compared to the data presented to their counterparts in the pixel block coder 610.

The adder 626.1 may invert operations performed by the subtractor 612. It may receive the same prediction pixel block from the prediction system 650 that the subtractor 612 used in generating residual signals. The adder 626.1 may add the prediction pixel block to reconstructed residual values output by the upscaler 625 and may output reconstructed pixel block data.

The coefficient dequantizer 622, the inverse transform unit 623, the residual dequantizer 624, the upscaler 625, and the first adder 626.1 may define the full effort decode path of the pixel block decoder 620. It includes a full array of decoding units that operate as counterparts to the sub-units of the pixel block coder 610, namely the subtractor 612, the downscaler 613, the residual quantizer 614, the transform unit 615, and the coefficient quantizer 616.

The second adder 626.2 may take its input from the inverse transform unit 623, which represents pixel residual data generated from a set of decoding units that are not a full set of counterparts to the coding units of the pixel block coder 610. As such, the second adder 626.2 defines the best effort decode path of the pixel block decoder 620. The second adder 626.2 accepts prediction data from the prediction system 650 taken from the best effort prediction buffer 640.2 using prediction references derived from the full effort prediction buffer 640.1. That is, if the prediction system 650 selects a pixel block from a given frame from the full effort prediction buffer 640.1 as a prediction reference for an input pixel block, it will furnish the selected pixel block to the subtractor 612 and the full effort adder 626.1. The prediction system 650 also will furnish a pixel block from a same location of the same frame as stored in the best effort prediction buffer 640.2 to the second adder 626.2.

The in-loop filters 630.1, 630.2 may perform various filtering operations on their respective pixel block data. For example, the in-loop filters 630.1, 630.2 may include deblocking filters and SAO filters (not shown). The deblocking filter may filter data at seams between reconstructed pixel blocks to reduce discontinuities between the pixel blocks that arise due to coding. SAO filters may add offset to pixel values according to an SAO type, for example, based on edge direction/shape and/or pixel level. The in-loop filters 630.1, 630.2 may operate according to parameters that are selected by the controller 660.

The prediction buffers 640.1, 640.2 may store filtered pixel data from the respective in-loop filters 630.1, 630.2 for use in later prediction of other pixel blocks. Different types of prediction data are made available to the prediction system 650 for different prediction modes. As discussed, for an input pixel block, intra prediction takes a prediction reference from decoded data of the same frame in which the input pixel block is located. Thus, the prediction buffers 640.1, 640.2 may store decoded pixel block data of each frame as it is coded. For the same input pixel block, inter prediction may take a prediction reference from previously coded and decoded frame(s) that are designated as "reference frames." Thus, the prediction buffers 640.1, 640.2 may store these decoded reference frames.

As discussed, the prediction system 650 may supply prediction data to the pixel block coder 610 for use in generating residuals. The prediction system 650 may include a mode decision unit 652 and a pair of prediction units 654.1, 654.2. The mode decision unit 652 may include the inter predictor and intra predictor of the foregoing embodiments. Thus, the mode decision unit 654 may receive pixel block data representing a new pixel block to be coded and may search the full effort prediction buffer 640.1 for pixel block data from reference frame(s) for use in coding the input pixel block. The decision unit 654 may support a plurality of prediction modes, such as the single list prediction mode and the bi-predictive mode. When inter coding is selected, the mode decision unit may generate prediction reference indicators, such as motion vectors, to identify which portion(s) of which reference frames were selected as source(s) of prediction for the input pixel block.

The mode decision unit 652 also may support Intra (I) mode coding. Thus, the mode decision unit 652 may search the full effort prediction buffer 640.1 for coded pixel block data from the same frame as the pixel block being coded that provides a closest match to the input pixel block. When I coding is selected, the mode decision unit 652 also may generate prediction reference indicators to identify which portion of the frame was selected as a source of prediction for the input pixel block.

As discussed, typically, the mode decision unit 654 selects a prediction mode that will achieve the lowest distortion when video is decoded. Exceptions may arise when coding modes are selected to satisfy other policies to which the coding system 600 adheres, such as supporting random access or data refresh policies. In an embodiment, the mode decision unit 654 may monitor coding errors that accumulate in decoded video data obtained by the full effort decode path and the best effort decode path. It may alter its default prediction decisions, for example, if it determines that accumulated coding errors in the best effort decode path exceed a predetermined value.

The full effort predictor 654.1 may furnish prediction data from the full effort prediction buffer 640.1 that is identified by the prediction references generated by the mode decision unit 652 to the subtractor 612 and the full effort adder 626.1. The best effort predictor 654.2 may furnish prediction data from the best effort prediction buffer 640.2 that is identified by the prediction references generated by the mode decision unit 652 to the best effort adder 626.2.

The controller 660 may control overall operation of the coding system 600. The controller 660 may select operational parameters for the pixel block coder 610 and the prediction system 650 based on analyses of input pixel blocks and also external constraints, such as coding bitrate targets and other operational parameters. As is relevant to the present discussion, when it selects quantization parameters such as the downscaling parameter $Q_R$, the residual quantization parameter $Q_{SP}$, the coefficient quantizer $Q_P$, and/or the transform mode M, it may provide those parameters to the syntax unit 670, which may include data representing those parameters in the data stream of coded video data output by the system 600. The controller 660 also may determine that no quantization should be applied by one or more quantizer units (say, the coefficient quantizer 616), in which case, the controller 660 may disable the quantizer. As discussed above, the controller 660 also may determine a mode of operation of the transform unit 615.

As discussed, quantization parameters $Q_R$, $Q_{SP}$, and/or $Q_P$ need not be provided as single values that are applied uniformly to all pixels of a pixel block but, instead, can be provided as respective arrays of quantization parameters whose values change at each pixel position. In one embodiment, a variety of quantizer arrays may be defined according to a predetermined protocol, each having respective quantization values at different pixel positions; during operation, a controller 660 may identify which array to use by providing an index or other identifier.

In another embodiment, quantization parameters $Q_R$, $Q_{SP}$, and/or $Q_P$ (whether single valued or an array of values, may be derived from characteristics of image data. For example, the quantization parameters $Q_{SP}$ may be selected for each sample position based on the intensity of their corresponding prediction samples, for example, a larger quantizer value may be selected for a larger prediction sample value than for a smaller prediction sample value. These quantization parameters could be defined using a linear, i.e. a scaler, formulation, or use a more complex non-linear/non-uniform formulation.

In one embodiment, a quantizer may be expressed by a predetermined function of the form $q(i,j)=f_k(p(i,j), i, j)$, where q represents the quantizer at issue, i and j represent locations of the value (either the pixel-domain value or the transform-domain value) within a pixel block being quantized, $p(i,j)$ represents the pixel intensity value being quantized, and $f_k$ represents a function relating p, i and j to q. As part of signaling, the controller 260 may provide data identifying the function being used, and any other data on which the respective function operates (for example, any scalars and offsets that may be at work in the respective function).

The quantization process could also be specified using a look up table form (not shown). The look-up table form may involve the use of interpolation techniques to determine the quantization/dequantization process of certain values that are not contained in the look-up table. Alternatively, the quantization parameters $Q_R$ and/or $Q_{SP}$, $Q_P$ may be predicted from quantization parameters of previously-coded neighboring pixel blocks. In a further embodiment, a first set of quantization parameters $Q_R$ and/or $Q_{SP}$, $Q_P$ may be signaled in a higher level construct of a coding sequence (for example, a frame or slice header) and alterations to the signaled set of quantization parameters $Q_R$ and/or $Q_{SP}$, $Q_P$ may be signaled on a pixel block-by-pixel block basis as the pixel blocks of the construct are coded.

During operation, the controller 660 may revise operational parameters of the quantizers 613, 614, and 616 and the transform unit 615 at different granularities of image data, either on a per pixel block basis or on a larger granularity (for example, per frame, per slice, per LCU, or another region). In an embodiment, the quantization parameters may be revised on a per-pixel basis within a coded frame.

Additionally, as discussed, the controller 660 may control operation of the in-loop filters 630.1, 630.2 and the prediction system 650. Such control may include, for the prediction unit 650, mode selection (lambda, modes to be tested, search windows, distortion strategies, etc.), and, for the in-loop filters 630.1, 630.2, selection of filter parameters, reordering parameters, weighted prediction, etc.

The coding system 600 of FIG. 6 provides the flexibility in coding that is provided in the embodiment of FIG. 2 and, additionally, finds application with various types of decoders. It may code data in a manner that, in the absence of transmission errors, operates synchronously with the decoding system 300 of FIG. 3. The coding system 600 also may operate with decoding systems 300 that can alternate operation between in a full decode mode and a best effort mode, represented by bypass path 327 (FIG. 3).

Figure 7:
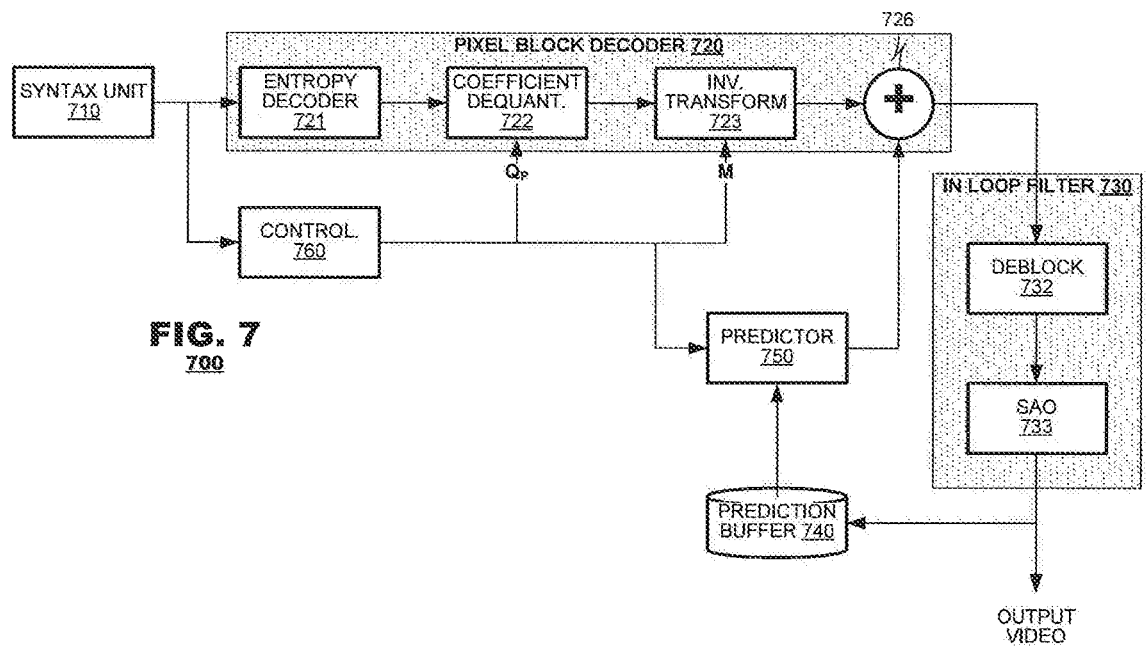
FIG. 7 is a functional block diagram of a decoding system operable with the coding system of FIG. 6.

The coding system 600 of FIG. 6 also may generate coded video data that operates with less-capable video decoders, for example, a video decoding system 700 as illustrated in FIG. 7 which has a decoder 720, which as compared to the decoding system 300 of FIG. 3 does not possess a residual dequantizer 324 or an upscaler 325. And, if the coding system 600 (FIG. 6) makes coding decisions that consider and mitigate accumulation of coding errors in the best effort decode path, then decoding systems 700 such as illustrated in FIG. 7 may decode the coded video with passable coding performance.

Figure 8:
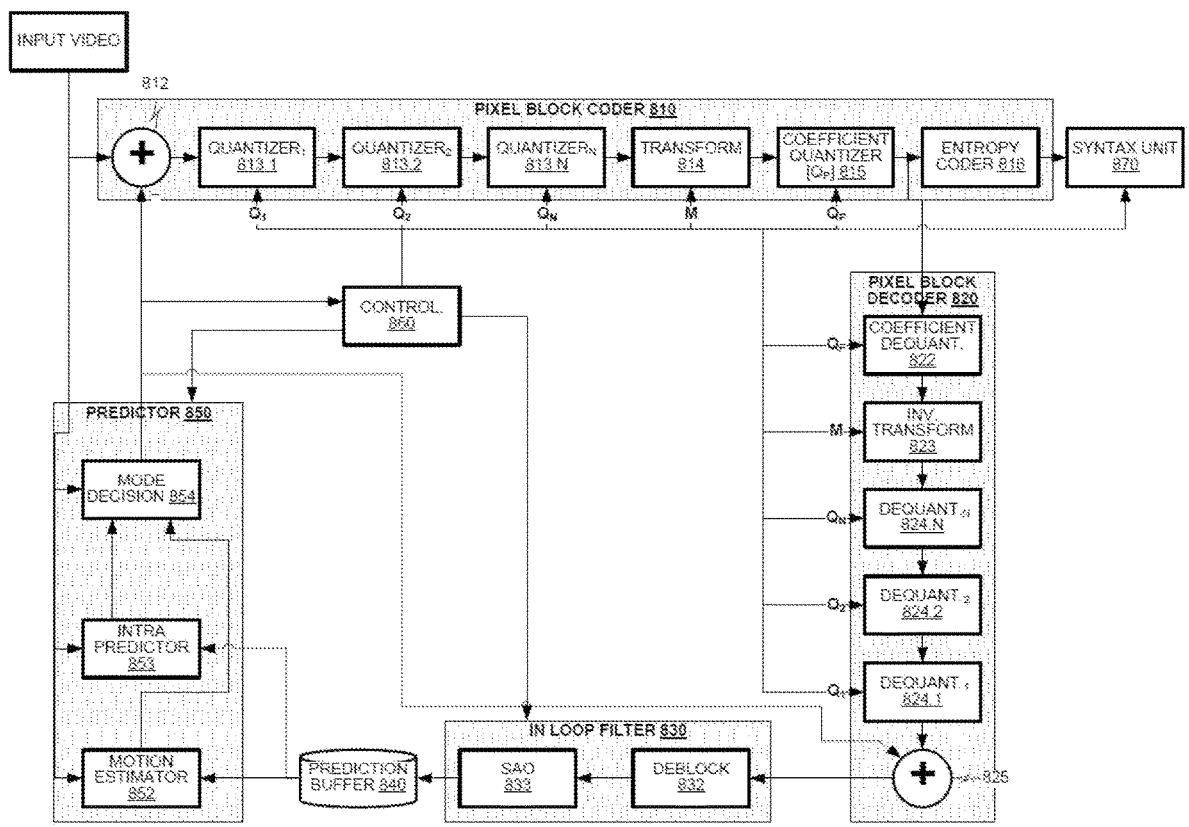
FIG. 8 is a functional block diagram of a coding system according to another embodiment of the present disclosure.

FIG. 8 is a functional block diagram of a coding system 800 according to another embodiment of the present disclosure. The system 800 may include a pixel block coder 810, a pixel block decoder 820, an in-loop filter system 830, a prediction buffer 840, a predictor 850, a controller 860, and a syntax unit 870. The pixel block coder and decoder 810, 820 and the predictor 850 may operate iteratively on individual pixel blocks. The predictor 850 may predict data for use during coding of a newly-presented pixel block. The pixel block coder 810 may code the new pixel block by predictive coding techniques and present coded pixel block data to the syntax unit 870. The pixel block decoder 820 may decode the coded pixel block data, generating decoded pixel block data therefrom. The in-loop filter 830 may perform various filtering operations on decoded frame data that is assembled from the decoded pixel blocks obtained by the pixel block decoder 820. The filtered frame data may be stored in the prediction buffer 840 where it may be used as a source of prediction of a later-received pixel block. The syntax unit 870 may assemble a data stream from the coded pixel block data which conforms to a governing coding protocol.

The pixel block coder 810 may include a subtractor 812, a plurality of quantizers 813.1-813.N, a transform unit 814, a coefficient quantizer 815, and an entropy coder 816. The pixel block coder 810 may accept pixel blocks of input data at the subtractor 812. The subtractor 812 may receive predicted pixel blocks from the predictor 850 and generate an array of pixel residuals therefrom representing a difference between the input pixel block and the predicted pixel block. The quantizers 813.1-813.N each may perform quantization of the data they receive in a different domain of the image data. The transform unit 814 may apply a transform to the data input to it from a last of the quantizers 813.N, to convert the input data from the pixel domain to a domain of transform coefficients. The coefficient quantizer 815 may perform quantization of transform coefficients output by the transform unit 814. The entropy coder 816 may reduce bandwidth of the output of the coefficient quantizer by coding the output, for example, by variable length code words.

The quantizers 813.1-813.N each may perform quantization of the data they receive in a respective domain of the image data. Here again, the quantized dimensions do not have to be orthogonal to each other. The quantizers 813.1-813.N may include the downscalers, and residual quantizers of the foregoing embodiments. They also may include other types of quantizers, such as color component-specific quantizers, frequency domain quantizers, directionally-specific quantizers (e.g., horizontal only, vertical only, blended), brightness-specific residual scalers, and the like. The quantizers 813.1-813.N may operate according to respective quantization parameters $Q_1$-$Q_N$ that define the levels of quantization that they provide. The quantization parameters $Q_1$-$Q_N$ may be signaled to a decoding system, either expressly or impliedly, in a coded bit stream. In some scenarios, individual quantizers 813.1, 813.2, ..., 813.N may be disabled, in which case they simply may pass their input data to the next quantizer without alteration.

The transform unit 814 may operate in a variety of transform modes as events warrant. For example, the transform unit 814 may be selected to apply a DCT transform, a DST transform, a Walsh-Hadamard transform, a Haar transform, a Daubechies wavelet transform, or the like. In an embodiment, a controller 860 may select a coding mode to be applied by the transform unit 814 and may configure the transform unit 814 accordingly. The transform mode M also may be signaled in the coded video data, either expressly or impliedly.

The pixel block decoder 820 may include decoding units that invert coding operations of the pixel block coder 810. For example, the pixel block decoder 820 may include a coefficient dequantizer 822, an inverse transform unit 823, a plurality of dequantizers 824.1-824.N, and an adder 825. The pixel block decoder 820 may take its input data from an output of the coefficient quantizer 815. Again, although permissible, the pixel block decoder 820 need not perform entropy decoding of entropy-coded data since entropy coding is a lossless event. The coefficient dequantizer 822 may invert operations of the coefficient quantizer 815 of the pixel block coder 810. Similarly, the inverse transform unit 823 and the dequantizers 824.1-824.N may invert operations of the transform unit 814 and the quantizers 813.1-813.N, respectively. They may use the same quantization parameters $Q_1$-$Q_N$ and transform mode M as their counterparts in the pixel block coder 810. Operations of the quantizers 813.1-813.N and the coefficient quantizer 815 likely will truncate data in various respects and, therefore, data recovered by the dequantizers 824.1-824.N likely will possess coding errors when compared to the data presented to their counterparts in the pixel block coder 810.

The adder 825 may invert operations performed by the subtractor 812. It may receive the same prediction pixel block from the predictor 850 that the subtractor 812 used in generating residual signals. The adder 825 may add the prediction pixel block to reconstructed residual values output by the final dequantizer 824.1 and may output reconstructed pixel block data.

The in-loop filter 830 may perform various filtering operations on reconstructed pixel block data. For example, the in-loop filter 830 may include a deblocking filter 832 and an SAO filter 833. The deblocking filter 832 may filter data at seams between reconstructed pixel blocks to reduce discontinuities between the pixel blocks that arise due to coding. The SAO filter 833 may add offset to pixel values according to an SAO type, for example, based on edge direction/shape and/or pixel level. The in-loop filter 830 may operate according to parameters that are selected by the controller 860.

The prediction buffer 840 may store filtered pixel data for use in later prediction of other pixel blocks. Different types of prediction data are made available to the predictor 850 for different prediction modes. For example, for an input pixel block, intra prediction takes a prediction reference from decoded data of the same frame in which the input pixel block is located. Thus, the prediction buffer 840 may store decoded pixel block data of each frame as it is coded. For the same input pixel block, inter prediction may take a prediction reference from previously coded and decoded frame(s) that are designated as reference frames. Thus, the prediction buffer 840 may store these decode reference frames.

As discussed, the predictor 850 may supply prediction data to the pixel block coder 810 for use in generating residuals. The predictor 850 may include an inter predictor 852, an intra predictor 853 and a mode decision unit 854. The inter predictor 852 may receive pixel block data representing a new pixel block to be coded and may search the prediction buffer 840 for pixel block data from reference frame(s) for use in coding the input pixel block. The inter predictor 852 may support a plurality of prediction modes, such as P and B mode coding, which supplies prediction data from one or a pair of reference frames. The inter predictor 852 may select an inter prediction mode and supply prediction data that provides a closest match to the input pixel block being coded. The inter predictor 852 may generate prediction reference indicators, such as motion vectors, to identify which portion(s) of which reference frames were selected as source(s) of prediction for the input pixel block.

The intra predictor 853 may support intra coding. The intra predictor 853 may search from among coded pixel block data from the same frame as the pixel block being coded that provides a closest match to the input pixel block. The intra predictor 853 also may generate prediction reference indicators to identify which portion of the frame was selected as a source of prediction for the input pixel block.

In a further embodiment, the predictor 850 may determine that no prediction should be performed when coding an input pixel block. In this event, the predictor 850 may disable the subtractor 812 (effectively by providing no prediction data to the subtractor 812) and the subtractor 812 may output pixel values to the quantizer chain 813.1-813.N. The quantizers 813.1-813.N would operate on pixel values rather than pixel residuals, in this mode of operation. Similarly, the pixel block decoder 820 may disable the adder 825 when decoding a pixel block coded in this manner. Further, the controller 860 may provide mode decision signals in a decoded bit stream that, when processed by a decoder (FIG. 9) would cause an adder in the decoder also to be disabled when decoding the pixel block coded in this manner.

The mode decision unit 854 may select a final coding mode to be applied to the input pixel block. Typically, the mode decision unit 854 selects the prediction mode that will achieve the lowest distortion when video is decoded. Exceptions may arise when coding modes are selected to satisfy other policies to which the coding system 800 adheres, such as supporting random access or data refresh policies. The mode decision unit 854 may output the prediction data to the pixel block coder and decoder 810, 820 and may supply to the controller 860 an identification of the selected prediction mode along with the prediction reference indicators corresponding to the selected mode.

The controller 860 may control overall operation of the coding system 800. The controller 860 may select operational parameters for the pixel block coder 810 and the predictor 850 based on analyses of input pixel blocks and also external constraints, such as coding bitrate targets and other operational parameters. As is relevant to the present discussion, when it selects quantization parameters $Q_1$-$Q_N$ and transform modes M, it may provide those parameters to the syntax unit 870, which may include data representing those parameters in the data stream of coded video data output by the system 800. The controller 860 also may determine that no quantization should be applied by one or more quantizer units (say, the quantizer 813.2), in which case, the controller 860 may disable the quantizer 813.2. As discussed above, the controller 860 also may determine a mode of operation of the transform unit 814.

In another embodiment, quantization parameters $Q_1$-$Q_N$ (whether single valued or an array of values, may be derived from characteristics of image data. For example, the quantization parameter $Q_1$ may be selected based on the intensity of the prediction pixel values that correspond to the pixel residuals. In this case, the value of $Q_1$ may vary for every pixel according to the intensity value of the predictor, e.g. it could be higher for a sample with a larger predictor value than a sample with a smaller predictor value. These quantization parameters could be defined using a linear, i.e. a scaler, formulation, or using a more complex non-linear/non-uniform formulation.

In one embodiment, a quantizer may be expressed by a predetermined function of the form $q(i,j)=f_k(p(i,j), i, j)$, where q represents the quantizer at issue, i and j represent locations of the value (either the pixel-domain value or the transform-domain value) within a pixel block being quantized, $p(i,j)$ represents the pixel intensity value being quantized, and $f_k$ represents a function relating p, i and j to q. As part of the signaling, the controller 260 may provide data identifying the function being used, and any other data on which the respective function operates (for example, any scalars and offsets that may be at work in the respective function).

The quantization process could also be specified using a look up table form (not shown). The look-up table form may involve the use of interpolation techniques to determine the quantization/dequantization process of certain values that are not contained in the look-up table. Alternatively, the quantization parameters $Q_1$-$Q_N$ may be predicted from quantization parameters of previously-coded neighboring pixel blocks. In a further embodiment, a first set of quantization parameters $Q_1$-$Q_N$ may be signaled in a higher level construct of a coding sequence (for example, a frame or slice header) and alterations to the signaled set of quantization parameters $Q_1$-$Q_N$ may be signaled on a pixel block-by-pixel block basis as the pixel blocks of the construct are coded.

During operation, the controller 860 may revise operational parameters of the quantizers 813, 814, and 815 and the transform unit 814 at different granularities of image data, either on a per pixel block basis or on a larger granularity, for example, per frame, per slice, per LCU or another region. In an embodiment, quantization parameters may be revised on a per pixel basis.

Additionally, as discussed, the controller 860 may control operation of the in-loop filter 830 and the predictor 850. Such control may include, for the predictor 850, mode selection (lambda, modes to be tested, search windows, distortion strategies, etc.), and, for the in-loop filter 830, selection of filter parameters, reordering parameters, weighted prediction, etc.

Figure 9:
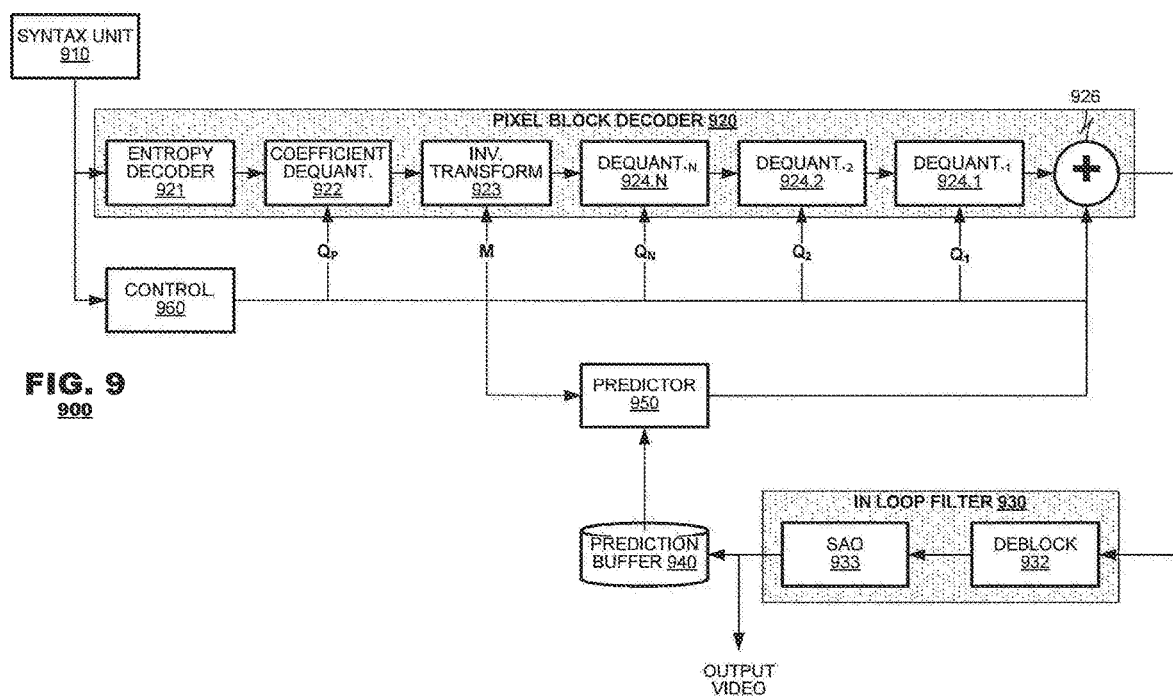
FIG. 9 is a functional block diagram of a decoding system according to an embodiment of the present disclosure.

FIG. 9 is a functional block diagram of a decoding system 900 according to an embodiment of the present disclosure. The decoding system 900 may include a syntax unit 910, a pixel-block decoder 920, an in-loop filter 930, a prediction buffer 940, a predictor 950, and a controller 960. The syntax unit 910 may receive a coded video data stream and may parse the coded data into its constituent parts. Data representing coding parameters may be furnished to the controller 960 while data representing coded residuals (the data output by the pixel block coder 810 of FIG. 8) may be furnished to the pixel block decoder 920. The pixel block decoder 920 may invert coding operations provided by the pixel block coder 810 (FIG. 8). The in-loop filter 930 may filter reconstructed pixel block data. The reconstructed pixel block data may be assembled into frames for display and output from the decoding system 900 as output video. The frames also may be stored in the prediction buffer 940 for use in prediction operations. The predictor 950 may supply prediction data to the pixel block decoder 920 as determined by coding data received in the coded video data stream.

The pixel block decoder 920 may include an entropy decoder 921, a coefficient dequantizer 922, an inverse transform unit 923, a plurality of dequantizers 924.1-924.N, and an adder 925. The entropy decoder 921 may perform entropy decoding to invert processes performed by the entropy coder 816 (FIG. 8). The coefficient dequantizer 922 may invert operations of the coefficient quantizer 815 of the pixel block coder 810 (FIG. 8). Similarly, the inverse transform unit 923 and dequantizers 924.1-924.N may invert operations of the transform unit 814 and the quantizers 813.1-813.N (FIG. 8), respectively. They may use the quantization parameters $Q_1$-$Q_N$ and transform modes M that are provided in the coded video data stream. Because operations of the quantizers 813.1-813.N and the coefficient quantizer 815 truncate data in various respects, the data reconstructed by the coefficient dequantizer 922 and the dequantizers 924.1-924.N likely will possess coding errors when compared to the input data presented to their counterparts in the pixel block coder 810 (FIG. 8).

The adder 925 may invert operations performed by the subtractor 812 (FIG. 8). It may receive a prediction pixel block from the predictor 950 as determined by prediction references in the coded video data stream. The adder 925 may add the prediction pixel block to reconstructed residual values input to it from a preceding dequantizer 924.1 and may output reconstructed pixel block data.

The in-loop filter 930 may perform various filtering operations on reconstructed pixel block data. As illustrated, the in-loop filter 930 may include a deblocking filter 932 and an SAO filter 933. The deblocking filter 932 may filter data at seams between reconstructed pixel blocks to reduce discontinuities between the pixel blocks that arise due to coding. SAO filters may add offset to pixel values according to an SAO type, for example, based on edge direction/shape and/or pixel level. Operation of the deblocking filter 932 and the SAO filter 933 ideally would mimic operation of their counterparts in the coding system 800 (FIG. 8). Thus, in the absence of transmission errors or other abnormalities, the decoded frame data obtained from the in-loop filter 930 of the decoding system 900 would be the same as the decoded frame data obtained from the in-loop filter 830 of the coding system 800 (FIG. 8); in this manner, the coding system 800 and the decoding system 900 should store a common set of reference pictures in their respective prediction buffers 840, 940.

The prediction buffer 940 may store filtered pixel data for use in later prediction of other pixel blocks. The prediction buffer 940 may store decoded pixel block data of each frame as it is coded for use in intra prediction. The prediction buffer 940 also may store decoded reference frames.

As discussed, the predictor 950 may supply prediction data to the pixel block decoder 920. The predictor 950 may supply predicted pixel block data as determined by the prediction reference indicators supplied in the coded video data stream.

The controller 960 may control overall operation of the coding system 900. The controller 960 may set operational parameters for the pixel block decoder 920 and the predictor 950 based on parameters received in the coded video data stream. As is relevant to the present discussion, these operational parameters may include the quantization parameters $Q_1$-$Q_N$ and transform modes M for the dequantizers 924.1-924.N and inverse transform unit 923. As discussed, the received parameters may be set at various granularities of image data, for example, on a per pixel basis, a per pixel block basis, a per frame basis, a per slice basis, a per LCU basis, or based on other types of regions defined for the input image.

The embodiments of FIGS. 8 and 9 provide for quantization of image data along several dimensions, a greater number of dimensions than the embodiments of FIGS. 2 and 3. In implementation, circuit designers may find it convenient to design coding and decoding systems with as many types of quantizers 813.1-813.N and dequantizers 924.1-924.N as are suitable for their applications. Without coordination among the distributers of coding systems and decoding systems, it is likely that individual coding systems and decoding systems will possess mismatched sets of quantizers 813.1-813.N and dequantizers 924.1-924.N. In such circumstances, a coding system and a decoding system may exchange data identifying the capabilities of their quantizers 813.1-813.N and dequantizers 924.1-924.N during an initialization phase of a video coding session. Through negotiation, the coding system and the decoding system may determine whether they share any quantizers 813.1-813.N and dequantizers 924.1-924.N in common. If so, the coding system and the decoding system may disable those quantizers 813.1-813.N and dequantizers 924.1-924.N that are not shared in common, setting them to a pass through state, and conduct video coding using those quantizers 813.1-813.N and dequantizers 924.1-924.N that are shared in common. Thus, coding systems and decoding systems may achieve advantages inherent in the present disclosure even though their capabilities are not identical.

Figure 10:
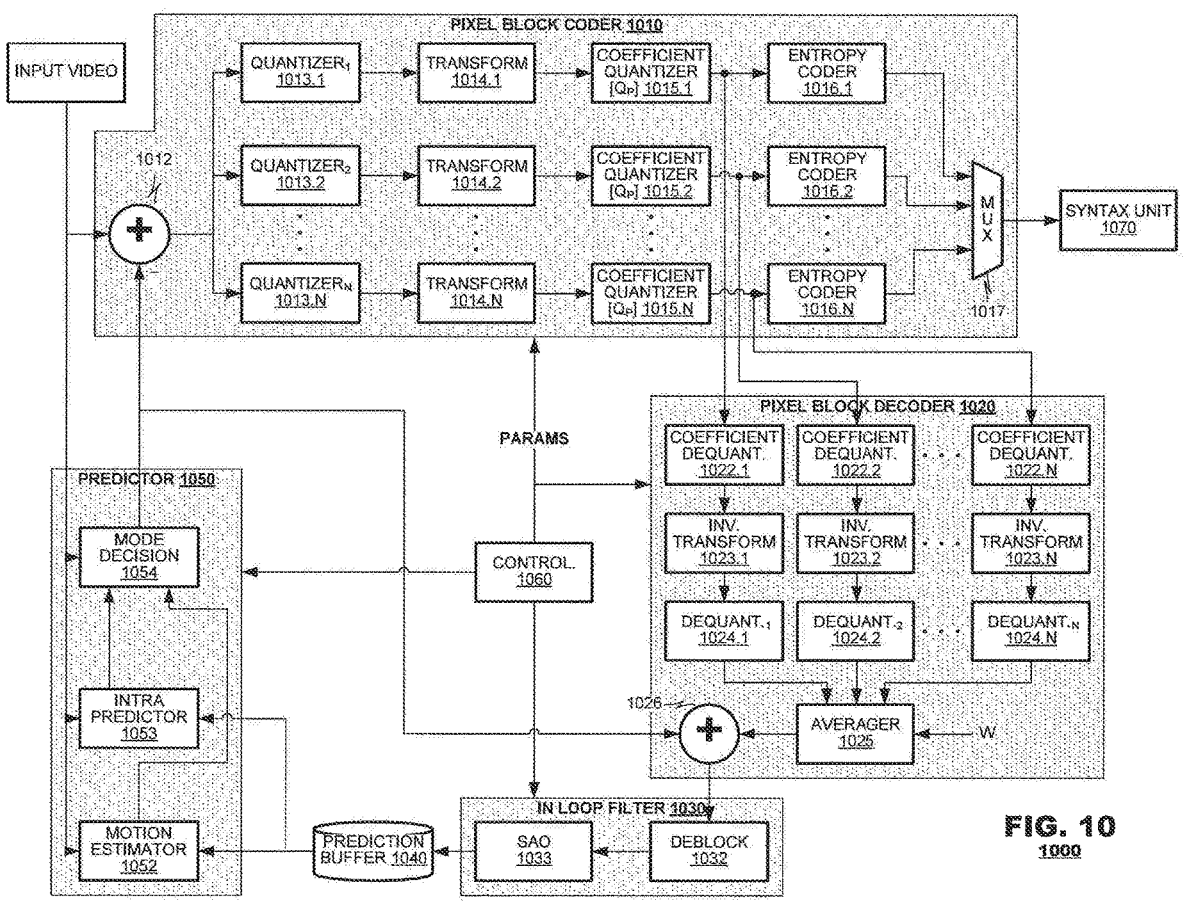
FIG. 10 is a functional block diagram of a coding system according to another embodiment of the present disclosure.

FIG. 10 is a functional block diagram of a coding system 1000 according to another embodiment of the present disclosure. The system 1000 may include a pixel block coder 1010, a pixel block decoder 1020, an in-loop filter system 1030, a prediction buffer 1040, a predictor 1050, a controller 1060, and a syntax unit 1070. The pixel block coder and decoder 1010, 1020 and the predictor 1050 may operate iteratively on individual pixel blocks. The predictor 1050 may predict data for use during coding of a newly-presented pixel block. The pixel block coder 1010 may code the new pixel block in several parallel coding chains and may present coded pixel block data to the syntax unit 1070. The pixel block decoder 1020 may decode the coded pixel block data, also in parallel decoding chains and may generate decoded pixel block data therefrom. The in-loop filter 1030 may perform various filtering operations on decoded frame data that is assembled from the decoded pixel blocks obtained by the pixel block decoder 1020. The filtered frame data may be stored in the prediction buffer 1040 where it may be used as a source of prediction of a later-received pixel block. The syntax unit 1070 may assemble a data stream from the coded pixel block data which conforms to a governing coding protocol.

The pixel block coder 1010 may include a subtractor 1012 and parallel coding chains, each of which includes a respective quantizer 1013.1, 1013.2, ..., or 1013.N, a respective transform unit 1014.1, 1014.2, ..., or 1014.N, a respective coefficient quantizer 1015.1, 1015.2, ..., or 1015.N, and a respective entropy coder 1016.1, 1016.2, ..., or 1016.N. A multiplexer 1017 may merge the outputs of the entropy coder 1016.1, 1016.2, ..., or 1016.N into a unitary coded video stream, which may be output from the pixel block coder 1010 to the syntax unit 1070.

The pixel block coder 1010 may accept pixel blocks of input data at the subtractor 1012. The subtractor 1012 may receive predicted pixel blocks from the predictor 1050 and generate an array of pixel residuals therefrom representing pixel-wise differences between the input pixel block and the predicted pixel block. The quantizers 1013.1-1013.N each may perform quantization of the data they receive in a different domain of the image data. Here again, the quantized dimensions do not have to be orthogonal to each other. The transform units 1014.1-1014.N may apply transforms to the data input to them from the respective quantizers 1013.1-1013.N, to convert the input data from the pixel domain to a domain of transform coefficients. The coefficient quantizers 1015.1-1015.N may perform quantizations of transform coefficients input to them from their respective transform units 1014.1-1014.N. The entropy coders 1016.1-1016.N may reduce bandwidth of the input data presented to them from their respective coefficient quantizers 1015.1-1015.N, coding the output, for example, by variable length code words.

The quantizers 1013.1-1013.N each may perform quantization of the data they receive in a respective domain of the image data. The quantizers 1013.1-1013.N may be provided as, for example, downscalers, residual quantizers, color component-specific quantizers, frequency domain quantizers, directionally-specific quantizers (e.g., horizontal only, vertical only, blended), brightness-specific residual scalers, and the like. The quantizers 1013.1-1013.N may operate according to respective quantization parameters, supplied by the controller 1060, that define the levels of quantization that they provide. The quantization parameters may be signaled to a decoding system, either expressly or impliedly, in a coded bit stream. In some scenarios, individual quantizers 1013.1, 1013.2, ..., 1013.N may be disabled, in which they simply may pass their input data to the next quantizer without alteration. If two or more quantizers 1013.1, 1013.2, ..., 1013.N are disabled, then some of the associated coding chains may be disabled in their entirety.

The transform units 1014.1-1014.N may operate in a variety of transform modes as events warrant. For example, the transform unit 1014 may be selected to apply a DCT, a DST, a Walsh-Hadamard transform, a Haar transform, the Daubechies wavelet transform, or the like. Moreover, the transform units 1014.1-1014.N may be disabled when applying transform SKIP mode coding in the respective coding chain. In an embodiment, a controller 1060 may select a coding mode to be applied by the transform units 1014.1-1014.N, which may differ from chain to chain, and the controller 1060 may configure the transform units 1014.1-1014.N accordingly. The transform modes may be signaled in the coded video data, either expressly or impliedly.

The pixel block decoder 1020 may include decoding units that invert coding operations of the pixel block coder 1010. For example, the pixel block decoder 1020 may include coefficient dequantizers 1022.1-1022.N, inverse transform units 1023.1-1023.N and dequantizers 1024.1-1024.N, arranged in chains just as in the pixel block coder 1010. The pixel block decoder 1020 also may include an averager 1025 and an adder 1026.

The decoding chains of the pixel block decoder 1020 may take its input data from outputs of the respective coding chains of the pixel block coder 1010. Again, although permissible, the pixel block decoder 1020 need not perform entropy decoding of entropy-coded data since entropy coding is a lossless event. The coefficient dequantizers 1022.1-1022.N may invert operations of their counterpart quantizers 1015.1-1015.N of the pixel block coder 1010. Similarly, the inverse transform units 1023.1-1023.N and the dequantizers 1024.1-1024.N may invert operations of the transform units 1014.1-1014.N and the quantizers 1013.1-1013.N, respectively. They may use the same quantization parameters and transform modes as their counterparts in the pixel block coder 1010. Operations of the quantizers 1013.1-1013.N and the coefficient quantizer 1015 likely will truncate data in various respects and, therefore, residual data reconstructed by the coefficient dequantizers 1022.1-1022.N and the dequantizers 1024.1-1024.N likely will possess coding errors when compared to the data presented to their counterparts in the pixel block coder 1010.

The averager 1025 may average outputs of the various decoding chains. Contributions of the different coding chains may be given equal weight or, alternatively, may be weighted based on weights assigned by the controller 1060. In an embodiment, the controller 1060 may measure distortion of reconstructed data from the different chains and may select averaging weights that reduce such distortions once averaged. The output of the averager 1025 may be input to the adder 1026 as reconstructed residual data.

The adder 1026 may invert operations performed by the subtractor 1012. It may receive the same prediction pixel block from the predictor 1050 that the subtractor 1012 used in generating residual signals. The adder 1026 may add the prediction pixel block to reconstructed residual values output by the averager 1025 and may output reconstructed pixel block data.

The in-loop filter 1030 may perform various filtering operations on recovered pixel block data. For example, the in-loop filter 1030 may include a deblocking filter 1032 and an SAO filter 1033. The deblocking filter 1032 may filter data at seams between reconstructed pixel blocks to reduce discontinuities between the pixel blocks that arise due to coding. The SAO filter 1033 may add offset to pixel values according to an SAO type, for example, based on edge direction/shape and/or pixel level. The in-loop filter 1030 may operate according to parameters that are selected by the controller 1060.

The prediction buffer 1040 may store filtered pixel data for use in later prediction of other pixel blocks. Different types of prediction data are made available to the predictor 1050 for different prediction modes. For example, for an input pixel block, intra prediction takes a prediction reference from decoded data of the same frame in which the input pixel block is located. Thus, the prediction buffer 1040 may store decoded pixel block data of each frame as it is coded. For the same input pixel block, inter prediction may take a prediction reference from previously coded and decoded frame(s) that are designated as reference frames. Thus, the prediction buffer 1040 may store these decode reference frames.

As discussed, the predictor 1050 may supply prediction data to the pixel block coder 1010 for use in generating residuals. The predictor 1050 may include an inter predictor 1052, an intra predictor 1053 and a mode decision unit 1054. The inter predictor 1052 may receive pixel block data representing a new pixel block to be coded and may search the prediction buffer 1040 for pixel block data from reference frame(s) for use in coding the input pixel block. The inter predictor 1052 may support a plurality of prediction modes, such as P and B mode, which supplies prediction data from one or a pair of reference frames. The inter predictor 1052 may select an inter prediction mode and supply prediction data that provides a closest match to the input pixel block being coded. The inter predictor 1052 may generate prediction reference indicators, such as motion vectors, to identify which portion(s) of which reference frames were selected as source(s) of prediction for the input pixel block.

The intra predictor 1053 may support intra coding. The intra predictor 1053 may search from among coded pixel block data from the same frame as the pixel block being coded that provides a closest match to the input pixel block. The intra predictor 1053 also may generate prediction reference indicators to identify which portion of the frame was selected as a source of prediction for the input pixel block.

The mode decision unit 1054 may select a final coding mode to be applied to the input pixel block. Typically, the mode decision unit 1054 selects the prediction mode that will achieve the lowest distortion when video is decoded. Exceptions may arise when coding modes are selected to satisfy other policies to which the coding system 1000 adheres, such as supporting random access or data refresh policies. The mode decision unit 1054 may output the prediction data to the pixel block coder and decoder 1010, 1020 and may supply to the controller 1060 an identification of the selected prediction mode along with the prediction reference indicators corresponding to the selected mode.

The controller 1060 may control overall operation of the coding system 1000. The controller 1060 may select operational parameters for the pixel block coder 1010 and the predictor 1050 based on analyses of input pixel blocks and also external constraints, such as coding bitrate targets and other operational parameters. As is relevant to the present discussion, when it selects quantization parameters to be used by the quantizers 1013.1-1013.N and transform modes, it may provide those parameters to the syntax unit 1070, which may include data representing those parameters in the data stream of coded video data output by the system 1000. The controller 1060 also may determine that no quantization should be applied by one or more quantizer units (say, the quantizer 1013.2), in which case, the controller 1060 may disable the quantizer 1013.2. As discussed above, the controller 1060 also may determine a mode of operation of the transform unit 1014.

As discussed, quantization parameters need not be provided as single values that are applied uniformly to all pixels of a pixel block but, instead, can be provided as respective arrays of quantization parameters whose values change at each pixel position. In one embodiment, a variety of quantizer arrays may be defined according to a predetermined protocol, each having respective quantization values at different pixel positions; during operation, a controller 1060 may identify which array to use by providing an index or other identifier.

In another embodiment, quantization parameters (whether single valued or an array of values, may be derived from characteristics of image data. For example, a quantization parameter may be selected based on the intensity of the prediction pixel values that correspond to the pixel residuals. In this case, the value of the quantization parameter may vary for every pixel according to the intensity value of the predictor, e.g. it could be higher for a sample with a larger predictor value than a sample with a smaller predictor value. These quantization parameters could be defined using a linear, i.e. a scaler, formulation, or use a more complex non-linear/non-uniform formulation.

In one embodiment, a quantizer may be expressed by a predetermined function of the form $q(i,j)=f_k(p(i,j), i, j)$, where q represents the quantizer at issue, i and j represent locations of the value (either the pixel-domain value or the transform-domain value) within a pixel block being quantized, $p(i,j)$ represents the pixel intensity value being quantized, and $f_k$ represents a function relating p, i and j to q. As part of the signaling, the controller 260 may provide data identifying the function being used, and any other data on which the respective function operates (for example, any scalars and offsets that may be at work in the respective function).

The quantization process could also be specified using a look up table form (not shown). The look-up table form may involve the use of interpolation techniques to determine the quantization/dequantization process of certain values that are not contained in the look-up table. Alternatively, the quantization parameters may be predicted from quantization parameters of previously-coded neighboring pixel blocks. In a further embodiment, a first set of quantization parameters may be signaled in a higher level construct of a coding sequence (for example, a frame or slice header) and alterations to the signaled set of quantization parameters may be signaled on a pixel block-by-pixel block basis as the pixel blocks of the construct are coded.

During operation, the controller 1060 may revise operational parameters of the quantizers 1013, 1014 and 1015 and the transform unit 1014 at different granularities of image data, either on a per pixel block basis or on a larger granularity, for example, per frame, per slice, per LCU, or another region. In an embodiment, quantization parameters may be revised on a per pixel basis.

Additionally, as discussed, the controller 1060 may control operation of the in-loop filter 1030 and the predictor 1050. Such control may include, for the predictor 1050, mode selection (lambda, modes to be tested, search windows, distortion strategies, etc.), and, for the in-loop filter 1030, selection of filter parameters, reordering parameters, weighted prediction, etc.

Figure 11:
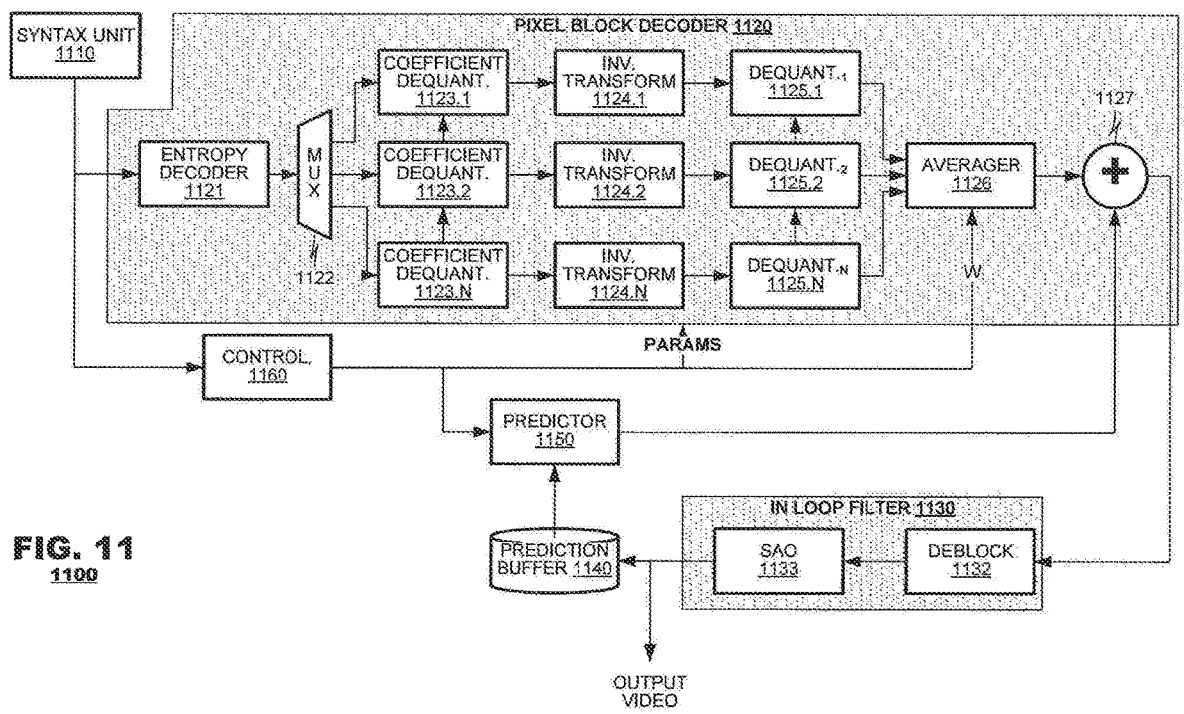
FIG. 11 is a functional block diagram of a decoding system according to an embodiment of the present disclosure.

FIG. 11 is a functional block diagram of a decoding system 1100 according to an embodiment of the present disclosure. The decoding system 1100 may include a syntax unit 1110, a pixel-block decoder 1120, an in-loop filter 1130, a prediction buffer 1140, a predictor 1150 and a controller 1160. The syntax unit 1110 may receive a coded video data stream and may parse the coded data into its constituent parts. Data representing coding parameters may be furnished to the controller 1160 while data representing coded residuals (the data output by the pixel block coder 1010 of FIG. 10) may be furnished to the pixel block decoder 1120. The pixel block decoder 1120 may invert coding operations provided by the pixel block coder 1010 (FIG. 10). The in-loop filter 1130 may filter reconstructed pixel block data. The reconstructed pixel block data may be assembled into frames for display and output from the decoding system 1100 as output video. The frames also may be stored in the prediction buffer 1140 for use in prediction operations. The predictor 1150 may supply prediction data to the pixel block decoder 1120 as determined by coding data received in the coded video data stream.

The pixel block decoder 1120 may include an entropy decoder 1121, a demultiplexer 1122, a plurality of coefficient dequantizers 1123.1-1123.N, a plurality of inverse transform units 1124.1-1124.N, a plurality of dequantizers 1125.1-1125.N, an averager 1126, and an adder 1127. The entropy decoder 1121 may perform entropy decoding to invert processes performed by the entropy coder 1016 (FIG. 10). The demultiplexer 1122 may route coded video data from respective chains of the pixel block coder 1010 (FIG. 10) to corresponding decode chains in the pixel block decoder 1120. Each coefficient dequantizer 1123.1, 1123.2, . . . , 1123.N, may invert operations of a corresponding coefficient quantizer 1015.1, 1015.2, . . . , 1015.N of the pixel block coder 1010 (FIG. 10). Similarly, the inverse transform units 1124.1, 1124.2, . . . , 1124.N and dequantizers 1125.1, 1125.2, . . . , 1125.N may invert operations of their corresponding units from the pixel block coder 1010 (FIG. 10), respectively. They may use the quantization parameters that are provided in the coded video data stream. Because operations of the quantizers 1013.1-1013.N and the coefficient quantizers 1015.1-1015.N truncate data in various respects, the residual data reconstructed by the coefficient dequantizers 1123.1, 1123.2, . . . , 1123.N, and the dequantizers 1125.1-1125.N likely will possess coding errors when compared to the input data presented to their counterparts in the pixel block coder 1010 (FIG. 10).

The averager 1126 may average outputs of the various decoding chains. Contributions of the different coding chains may be given equal weight or, alternatively, may be weighted based on weights assigned by the controller 1160, which are obtained from coded video data. The output of the averager 1126 may be input to the adder 1127 as reconstructed residual data.

The adder 1127 may invert operations performed by the subtractor 1012 (FIG. 10). It may receive a prediction pixel block from the predictor 1150 as determined by prediction references in the coded video data stream. The adder 1127 may add the prediction pixel block to reconstructed residual values input to it from the averager 1126.

The in-loop filter 1130 may perform various filtering operations on reconstructed pixel block data. As illustrated, the in-loop filter 1130 may include a deblocking filter 1132 and an SAO filter 1133. The deblocking filter 1132 may filter data at seams between reconstructed pixel blocks to reduce discontinuities between the pixel blocks that arise due to coding. SAO filters may add offset to pixel values according to an SAO type, for example, based on edge direction/shape and/or pixel level. Operation of the deblocking filter 1132 and the SAO filter 1133 ideally would mimic operation of their counterparts in the coding system 1000 (FIG. 10). Thus, in the absence of transmission errors or other abnormalities, the decoded frame data obtained from the in-loop filter 1130 of the decoding system 1100 would be the same as the decoded frame data obtained from the in-loop filter 1030 of the coding system 1000 (FIG. 10); in this manner, the coding system 1000 and the decoding system 1100 should store a common set of reference pictures in their respective prediction buffers 1040, 1140.

The prediction buffer 1140 may store filtered pixel data for use in later prediction of other pixel blocks. The prediction buffer 1140 may store decoded pixel block data of each frame as it is coded for use in intra prediction. The prediction buffer 1140 also may store decoded reference frames.

As discussed, the predictor 1150 may supply prediction data to the pixel block decoder 1120. The predictor 1150 may supply predicted pixel block data as determined by the prediction reference indicators supplied in the coded video data stream.

The controller 1160 may control overall operation of the coding system 1100. The controller 1160 may set operational parameters for the pixel block decoder 1120 and the predictor 1150 based on parameters received in the coded video data stream. As is relevant to the present discussion, these operational parameters may include quantization parameters and modes of operation for the inverse transform unit 1123. As discussed, the received parameters may be set at various granularities of image data, for example, on a per pixel block basis, a per frame basis, a per slice basis, a per LCU basis or based on another regions defined for the input image.

The embodiments of FIGS. 10 and 11 provide for quantization of image data along several dimensions, a greater number of dimensions than the embodiments of FIGS. 2 and 3. As with the embodiments of FIGS. 8 and 9, the coding systems and decoding systems of FIGS. 10 and 11 may achieve advantages inherent in the present discussion even if the coding systems and decoding systems do not have identical quantizer capabilities.

Further, the embodiment of FIG. 10 provides a coding system an opportunity to test certain quantization techniques during coding to assess coding quality and bandwidth conversation. Following coding, the coding system 1000 of FIG. 10 may determine that results of a given coding chain are poor. In response to such a determination, the coding system may set the weight W of the respective coding chain to 0 and omit the coded data of that chain from the coded video data stream.

Figures 12, 13:
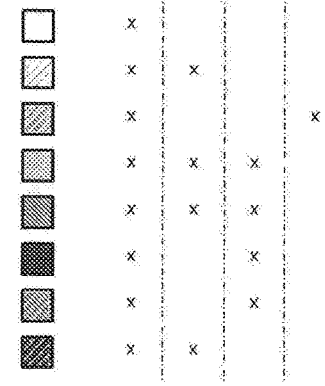
FIGS. 12 and 13 illustrate exemplary selections of quantization for frames according to embodiments of the present disclosure.

As discussed, operation of the quantizers and dequantizers of the foregoing embodiments may be reconfigured for each pixel block that is coded, then decoded. Accordingly, a single image may be subjected to a wide array of quantization operations. FIGS. 12 and 13 illustrate exemplary selections of quantization for frames.

Also as discussed, the selection of quantization modes for a given frame may be made at different granularities. It may be convenient, for example, to select quantization modes anew for each pixel block that is coded. In other embodiments, however, it may be convenient to select quantization modes on a per-slice basis, a per LCU basis or a per frame basis.

The foregoing discussion has described the various embodiments of the present disclosure in the context of coding systems, decoding systems and functional units that may embody them. In practice, these systems may be applied in a variety of devices, such as mobile devices provided with integrated video cameras (e.g., camera-enabled phones, entertainment systems and computers) and/or wired communication systems such as videoconferencing equipment and camera-enabled desktop computers. In some applications, the functional blocks described hereinabove may be provided as elements of an integrated software system, in which the blocks may be provided as elements of a computer program, which are stored as program instructions in memory and executed by a general processing system. In other applications, the functional blocks may be provided as discrete circuit components of a processing system, such as functional units within a digital signal processor or application-specific integrated circuit. Still other applications of the present invention may be embodied as a hybrid system of dedicated hardware and software components. Moreover, the functional blocks described herein need not be provided as separate elements. For example, although FIGS. 1-11 illustrate components of video coders and decoders as separate units, in one or more embodiments, some or all of them may be integrated and they need not be separate units. Such implementation details are immaterial to the operation of the present invention unless otherwise noted above.

Further, the figures illustrated herein have provided only so much detail as necessary to present the subject matter of the present invention. In practice, video coders and decoders typically will include functional units in addition to those described herein, including buffers to store data throughout the coding pipelines illustrated and communication transceivers to manage communication with the communication network and the counterpart coder/decoder device. Such elements have been omitted from the foregoing discussion for clarity.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A video decoding method, comprising:
   decoding reference image data of a coded video sequence received from a channel;
   predicting blocks of prediction data from decoded reference image data;
   entropy decoding coded video data of the coded video sequence, yielding blocks of transform coefficients and corresponding quantization parameters;
   transforming the transform coefficients in a transform-domain into blocks of reconstructed residual data in a pixel-domain;
   first dequantizing the blocks of reconstructed residual data into blocks of first dequantized residual data by inverting a first quantization type based on the corresponding quantization parameters, wherein the corresponding quantization parameters indicate a non-uniform quantization;
   generating reconstructed pixel values based on the blocks of first dequantized residual data and from the prediction data.

2. The video decoding method of claim 1, wherein the corresponding quantization parameters indicate quantization based on an intensity of the corresponding prediction block.

3. The video decoding method of claim 1, wherein the corresponding quantization parameters indicate a non-linear quantization.

4. The video decoding method of claim 1, wherein the corresponding quantization parameters indicate a predetermined function and associated parameters of the function.

5. The video decoding method of claim 4, wherein the associated parameters of the function include a scalar and an offset of the function.

6. The video decoding method of claim 1, and further comprising:
   second dequantizing the blocks of first dequantized residual data into second dequantized residual data by inverting a second quantization type based on the corresponding quantization parameters; and
   wherein the generating the reconstructed pixel values is based on the blocks of second dequantized residual data and from the prediction data.

7. A video decoder, comprising:
   a processor,
   a memory storing instructions that, when executed by the processor, cause:
   decoding reference image data of a coded video sequence received from a channel;
   predicting blocks of prediction data from decoded reference image data;
   entropy decoding coded video data of the coded video sequence, yielding blocks of transform coefficients and corresponding quantization parameters;
   transforming the transform coefficients in a transform-domain into blocks of reconstructed residual data in a pixel-domain;
   first dequantizing the blocks of reconstructed residual data into blocks of first dequantized residual data by inverting a first quantization type based on the corresponding quantization parameters, wherein the corresponding quantization parameters indicate a non-uniform quantization;
   generating reconstructed pixel values based on the blocks of first dequantized residual data and from the prediction data.

8. The video decoder of claim 7, wherein the corresponding quantization parameters indicate quantization based on an intensity of the corresponding prediction block.

9. The video decoder of claim 7, wherein the corresponding quantization parameters indicate a non-linear quantization.

10. The video decoder of claim 7, wherein the corresponding quantization parameters indicate a predetermined function and associated parameters of the function.

11. The video decoder of claim 10, wherein the associated parameters of the function include a scalar and an offset of the function.

12. The video decoder of claim 7, and the instructions further cause:
    second dequantizing the blocks of first dequantized residual data into second dequantized residual data by inverting a second quantization type based on the corresponding quantization parameters; and
    wherein the generating the reconstructed pixel values is based on the blocks of second dequantized residual data and from the prediction data.

13. A computer readable memory storing instructions that, when executed on a processor, causes a video decoding method comprising:
    decoding reference image data of a coded video sequence received from a channel;
    predicting blocks of prediction data from decoded reference image data;
    entropy decoding coded video data of the coded video sequence, yielding blocks of transform coefficients and corresponding quantization parameters;
    transforming the transform coefficients in a transform-domain into blocks of reconstructed residual data in a pixel-domain;
    first dequantizing the blocks of reconstructed residual data into blocks of first dequantized residual data by inverting a first quantization type based on the corresponding quantization parameters, wherein the corresponding quantization parameters indicate a non-uniform quantization;
    generating reconstructed pixel values based on the blocks of first dequantized residual data and from the prediction data.

14. The computer readable memory of claim 13, wherein the corresponding quantization parameters indicate quantization based on an intensity of the corresponding prediction block.

15. The computer readable memory of claim 13, wherein the corresponding quantization parameters indicate a non-linear quantization.

16. The computer readable memory of claim 13, wherein the corresponding quantization parameters indicate a predetermined function and associated parameters of the function.

17. The computer readable memory of claim 16, wherein the associated parameters of the function include a scalar and an offset of the function.

18. The computer readable memory of claim 13, wherein the instructions further cause:
   second dequantizing the blocks of first dequantized residual data into second dequantized residual data by inverting a second quantization type based on the corresponding quantization parameters; and
   wherein the generating the reconstructed pixel values is based on the blocks of second dequantized residual data and from the prediction data.

* * * * *

UNITED STATES PATENT AND TRADEMARK OFFICE
CERTIFICATE OF CORRECTION

| | |
|---|---|
| PATENT NO. | : 12,323,590 B2 |
| APPLICATION NO. | : 18/056915 |
| DATED | : June 3, 2025 |
| INVENTOR(S) | : Alexandros Tourapis et al. |

It is certified that error appears in the above-identified patent and that said Letters Patent is hereby corrected as shown below:

In the Specification

Column 2, Line 63, "of terminals 110, 150 interconnected via a network" should be --of terminals 110, 120 interconnected via a network--
Column 2, Line 64, "terminals 110, 150 may code video data for transmission to" should be --terminals 110, 120 may code video data for transmission to--
Column 2, Line 67, "transmit the coded video data to the counterpart terminal 150" should be --transmit the coded video data to the counterpart terminal 120--
Column 3, Line 1, "via a channel. The receiving terminal 150 may receive the" should be --via a channel. The receiving terminal 120 may receive the--
Column 3, Line 3, "example, on a display at the terminal 150. If the terminals" should be --example, on a display at the terminal 120. If the terminals--
Column 3, Line 5, "terminal 150 may capture video data locally, code the video" should be --terminal 120 may capture video data locally, code the video--
Column 3, Line 9, "150, decode it, and render it locally, for example, on its own" should be --120, decode it, and render it locally, for example, on its own--
Column 3, Line 16, "applications. In a first application, the terminals 110, 150" should be --applications. In a first application, the terminals 110, 120--
Column 3, Line 23, "downloading clients (e.g., terminal 150). Thus, the video" should be --downloading clients (e.g., terminal 120). Thus, the video--
Column 3, Line 29, "In FIG. 1(a), the terminals 110, 150 are illustrated as" should be --In FIG. 1(a), the terminals 110, 120 are illustrated as--
Column 3, Line 37, "convey coded video data between the terminals 110, 150," should be --convey coded video data between the terminals 110, 120,--
Column 4, Line 49, "appropriate units within the terminal 200. Although FIGS." should be --appropriate units within the terminal 120. Although FIGS.--
Column 5, Line 37, "110 to terminal 150 (FIG. 1(a)). In applications where" should be --110 to terminal 120 (FIG. 1(a)). In applications where--
Column 5, Line 39, "the terminals 110, 150, each terminal 110, 150 will possess" should be --the terminals 110, 120, each terminal 110, 120 will possess--

Signed and Sealed this
Ninth Day of September, 2025

Coke Morgan Stewart
*Acting Director of the United States Patent and Trademark Office*

Column 5, Line 41, "(FIG. 1(b)) and each terminal 110, 150 also will possess the" should be --(FIG. 1(b)) and each terminal 110, 120 also will possess the--

Column 5, Line 43, "1(c)). Indeed, in certain applications, terminals 110, 150 may" should be --1(c)). Indeed, in certain applications, terminals 110, 120 may--

Column 11, Line 12, "coefficient quantization, the pixel block 330 may be an" should be --coefficient quantization, the pixel block 440 may be an--

Column 11, Line 28, "pixel block 330 with losses induced by the quantization" should be --pixel block 440 with losses induced by the quantization--